(12) United States Patent
Ibaraki et al.

(10) Patent No.: US 7,254,543 B2
(45) Date of Patent: Aug. 7, 2007

(54) TELEVISION APPARATUS HAVING SPEECH RECOGNITION FUNCTION, AND METHOD OF CONTROLLING THE SAME

(75) Inventors: Toshio Ibaraki, 5-3-1108, Gakuen-cho, Ibaraki-shi, Osaka 567-0833 (JP); Masato Konishi, Kawanishi (JP); Hiroyuki Suda, Nagaokakyo (JP); Tsuyoshi Fukumoto, Kyoto (JP)

(73) Assignee: Toshio Ibaraki, Osaka (JP)

( * ) Notice: Subject to any disclaimer, the term of this patent is extended or adjusted under 35 U.S.C. 154(b) by 903 days.

(21) Appl. No.: 10/321,406

(22) Filed: Dec. 16, 2002

(65) Prior Publication Data

US 2003/0115067 A1      Jun. 19, 2003

(30) Foreign Application Priority Data

Dec. 18, 2001   (JP)   ............... 2001-384323

(51) Int. Cl.
*G10L 21/00*   (2006.01)
*G06F 3/16*   (2006.01)

(52) U.S. Cl. ................. 704/275; 704/270; 715/728
(58) Field of Classification Search .............. None
See application file for complete search history.

(56) References Cited

U.S. PATENT DOCUMENTS

| | | | | |
|---|---|---|---|---|
| 5,237,443 A | | 8/1993 | Kurisu et al. ............. 358/192.1 |
| 5,774,859 A | | 6/1998 | Houser et al. ............... 704/275 |
| 5,794,205 A | * | 8/1998 | Walters et al. ............... 704/275 |
| 6,119,088 A | | 9/2000 | Ciluffo ...................... 704/275 |
| 6,505,348 B1 | * | 1/2003 | Knowles et al. ............... 725/49 |
| 6,762,692 B1 | * | 7/2004 | Mingot et al. ......... 340/825.69 |
| 7,080,014 B2 | * | 7/2006 | Bush et al. .................. 704/275 |
| 2005/0144009 A1 | * | 6/2005 | Rodriguez et al. .......... 704/275 |
| 2005/0172319 A1 | * | 8/2005 | Reichardt et al. ............. 725/52 |

FOREIGN PATENT DOCUMENTS

| | | |
|---|---|---|
| EP | 0496492 | 1/1992 |
| EP | 1014710 | 12/1999 |
| EP | 1079371 | 2/2001 |
| JP | 63-70297 | 3/1988 |

\* cited by examiner

*Primary Examiner*—David Hudspeth
*Assistant Examiner*—Matthew J. Sked
(74) *Attorney, Agent, or Firm*—Sheridan Ross P.C.

(57) ABSTRACT

A television apparatus equipped with speech recognition function which allows the television apparatus to operate in accordance with a unit of language having an operable superordinate concept or makes the television apparatus operate after changing the operation mode, when a unit of language uttered by a user is unacceptable, is provided. The television apparatus according to the present invention judges whether it is possible for said television apparatus to operate in accordance with a speech code which is accepted under the current operation mode, and operates under this operation mode when it is possible to operate. When it is not possible to operate, if there is a speech code having an operable superordinate concept, the television apparatus operates in accordance with the speech code having the operable superordinate concept. If there is not a speech code having an operable superordinate concept, the television apparatus further judges whether it is possible to operate when it changes the operation mode. When it is possible to operate after the operation mode is changed, the television apparatus operates under the post-change operation mode.

7 Claims, 22 Drawing Sheets

F I G. 4

| CATEGORY CODE | | CATEGORY NAME |
|---|---|---|
| UPPER LEVEL | LOWER LEVEL | |
| 0 0 | | NEWS REPORTS |
| 0 1 | | SPORTS |
| 0 1 | 0 0 | BASEBALL |
| 0 1 | 0 1 | SOCCER |
| 0 1 | 0 2 | GOLF |
| 0 1 | 0 3 | PUBLIC GAMES |
| 0 2 | | EDUCATION/ INFORMATION |
| ⋮ | ⋮ | ⋮ |

FIG. 10

| GENRE / SUB GENRE | BS DIGITAL BROADCAST | TERRESTRIAL ANALOG BROADCAST | MESSAGE TO APPEAR WHILE BS DIGITAL BROADCAST IS WATCHED | MESSAGE TO APPEAR WHILE TERRESTRIAL BROADCAST IS WATCHED | MESSAGE TO APPEAR WHILE EXTERNAL INPUT IS USED |
|---|---|---|---|---|---|
| NEWS REPORTS | YES | NO | NOW SEARCHING IN "NEWS REPORTS" | VALID FOR BS DIGITAL | VALID FOR BS DIGITAL |
| SPORTS | YES | YES | NOW SEARCHING IN "SPORTS" | NOW SEARCHING IN "SPORTS" | VALID FOR TERRESTRIAL/BS DIGITAL |
| ALL SPORTS | YES | NO | NOW SEARCHING IN "ALL SPORTS" | NOW SEARCHING IN "SPORTS" | VALID FOR TERRESTRIAL/BS DIGITAL |
| BASEBALL | YES | NO | NOW SEARCHING IN "BASEBALL" | NOW SEARCHING IN "SPORTS" | VALID FOR BS DIGITAL |
| SOCCER | YES | NO | NOW SEARCHING IN "SOCCER" | NOW SEARCHING IN "SPORTS" | VALID FOR BS DIGITAL |
| GOLF | YES | NO | NOW SEARCHING IN "GOLF" | NOW SEARCHING IN "SPORTS" | VALID FOR BS DIGITAL |
| PUBLIC-SUPPORTED GAMES | YES | NO | NOW SEARCHING IN "PUBLIC-SUPPORTED GAMES" | NOW SEARCHING IN "SPORTS" | VALID FOR BS DIGITAL |
| OTHER SPORTS | YES | NO | NOW SEARCHING IN "OTHER SPORTS" | NOW SEARCHING IN "SPORTS" | VALID FOR BS DIGITAL |
| EDUCATION/INFORMATION | YES | NO | NOW SEARCHING IN "EDUCATION/INFORMATION" | VALID FOR BS DIGITAL | VALID FOR BS DIGITAL |
| ALL EDUCATION/INFORMATION | YES | NO | NOW SEARCHING IN "ALL EDUCATION/INFORMATION" | VALID FOR BS DIGITAL | VALID FOR BS DIGITAL |
| DAYTIME INFORMATION PROGRAMS | YES | NO | NOW SEARCHING IN "DAYTIME INFORMATION PROGRAMS" | VALID FOR BS DIGITAL | VALID FOR BS DIGITAL |
| DOCUMENTARY | YES | NO | NOW SEARCHING IN "DOCUMENTARY" | VALID FOR BS DIGITAL | VALID FOR BS DIGITAL |
| HOBBY/EDUCATION | YES | NO | NOW SEARCHING IN "HOBBY/EDUCATION" | VALID FOR BS DIGITAL | VALID FOR BS DIGITAL |
| DRAMAS | YES | YES | NOW SEARCHING IN "DRAMAS" | NOW SEARCHING IN "DRAMAS" | VALID FOR TERRESTRIAL/BS DIGITAL |
| MUSIC | YES | YES | NOW SEARCHING IN "MUSIC" | NOW SEARCHING IN "MUSIC" | VALID FOR TERRESTRIAL/BS DIGITAL |
| VARIETY SHOWS | YES | YES | NOW SEARCHING IN "VARIETY SHOWS" | NOW SEARCHING IN "VARIETY SHOWS" | VALID FOR TERRESTRIAL/BS DIGITAL |
| MOVIES | YES | YES | NOW SEARCHING IN "MOVIES" | NOW SEARCHING IN "MOVIES" | VALID FOR TERRESTRIAL/BS DIGITAL |
| ALL MOVIES | YES | NO | NOW SEARCHING IN "ALL MOVIES" | NOW SEARCHING IN "MOVIES" | VALID FOR BS DIGITAL |
| JAPANESE MOVIES | YES | NO | NOW SEARCHING IN "JAPANESE MOVIES" | NOW SEARCHING IN "MOVIES" | VALID FOR BS DIGITAL |
| WESTERN MOVIES | YES | NO | NOW SEARCHING IN "WESTERN MOVIES" | NOW SEARCHING IN "MOVIES" | VALID FOR BS DIGITAL |
| OTHER MOVIES | YES | NO | NOW SEARCHING IN "OTHER MOVIES" | NOW SEARCHING IN "MOVIES" | VALID FOR BS DIGITAL |
| ANIMATION/SPECIAL EFFECTS | YES | NO | NOW SEARCHING IN "ANIMATION/SPECIAL EFFECTS" | VALID FOR BS DIGITAL | VALID FOR BS DIGITAL |
| ----- | ----- | ----- | ----- | ----- | ----- |

FIG. 11
USER IS WATCHING TERRESTRIAL BROADCAST
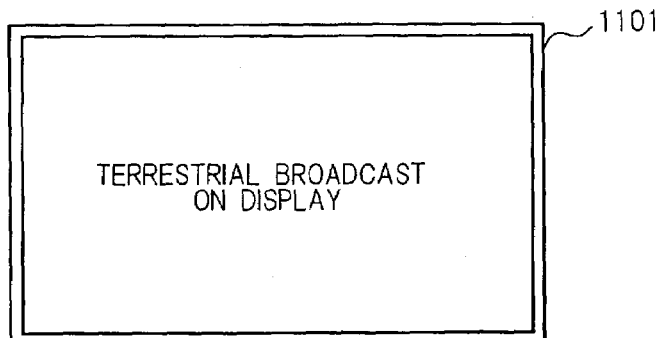
USER SAYS "SOCCER"
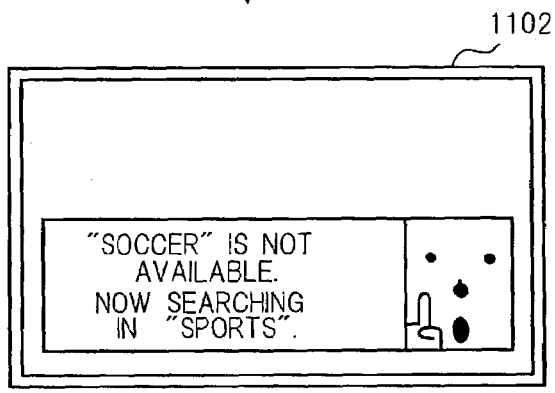
SEARCH IN THE GENRE "SPORTS"
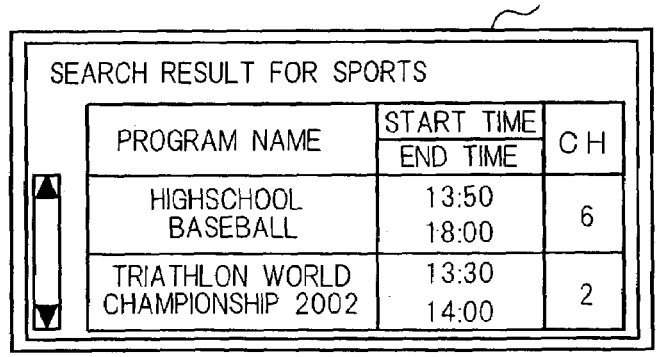

FIG. 19

| UPPER LEVEL | LOWER LEVEL |
|---|---|
| NEWS REPORTS | |
| SPORTS | BASEBALL |
| | GOLF |
| | TENNIS |
| | SKI |
| | BASKETBALL |
| | PUBLIC GAMES |
| | SOCCER |
| | ⋮ |
| EDUCATION/ INFORMATION | DAYTIME INFORMATION PROGRAMS |
| | DOCUMENTARY |
| | ⋮ |
| ⋮ | ⋮ |

F I G. 2 1

| CATEGORY | KEY WORD |
|---|---|
| BASEBALL | BALLPARK |
| | ICHIRO |
| | MAJOR LEAGUE |
| | ⋮ |
| SOCCER | NATIONAL TEAM |
| | J LEAGUE |
| | ⋮ |
| ⋮ | ⋮ |

| NEWS REPORTS | SPORTS | EDUCATION/ INFORMATION | DRAMA | MUSIC |

2202

| NEWS REPORTS | SPORTS | EDUCATION/ INFORMATION | DRAMA | MUSIC |
| | BASEBALL | | | |
| | SOCCER | | | |
| | GOLF | | | |
| | PUBLIC GAMES | | | |

2203

| | PROGRAM NAME | DATE OF BROADCAST | START TIME / END TIME | CH |
|---|---|---|---|---|
| B A S E B A L L | PROFESSIONAL BASEBALL GIANTS VS HANSHIN | DEC 26, TUESDAY | 18:55 / 20:55 | 101 |
| | PROFESSIONAL BASEBALL KINTETSU VS ORIX | DEC 26, TUESDAY | 18:00 / 21:25 | 102 |
| | MAJOR LEAGUE MARINERS VS RANGERS | DEC 28, THURSDAY | 18:00 / 20:30 | 103 |
| | | | | |

TELEVISION APPARATUS HAVING SPEECH RECOGNITION FUNCTION, AND METHOD OF CONTROLLING THE SAME

BACKGROUND OF THE INVENTION

The present invention relates to a television apparatus having a speech recognition function, and a method of controlling the same.

In the case of a prior art television apparatus, frequently used operations, such as selection of a channel, are assigned to buttons of a remote controller for instance. Further, as a user presses particular buttons on the remote controller, a menu having a hierarchical structure for each category is displayed on the screen and the user goes through the hierarchical structure, whereby a desired operation is performed.

With reference to FIG. 22, a description will now be given on the sequence of procedures for by-category program search using a menu having a by-category hierarchical structure which is provided in a prior art television apparatus. FIG. 22 is a screen transition diagram regarding by-category program search in accordance with operations made to a push-button type remote controller of the prior art television apparatus.

First, a display apparatus displays upper level categories (Screen 2201). As "SPORTS" is selected within the screen 2201, the display apparatus displays lower level categories for SPORTS (Screen 2202). As "BASEBALL" is selected in the screen 2202, the television apparatus executes by-category program search processing for "BASEBALL" and the display apparatus displays a search result list (Screen 2203).

As for parameters such as an off-timer time (predetermined time (30 minutes for example) of an off-timer mode wherein the television apparatus turns off after the predetermined time) and the aspect ratio of the screen (16:9 or 4:3 for instance), using a on-screen display for setting, a user can set one value which is selected from among a plurality of values.

When these set values are to be changed, the television apparatus makes a current set value displayed on the screen as a result of the first operation-inducing event (inputting of a set value changing instruction). While the on-screen display is provided, the setting is toggled every time the same operation-inducing event occurs.

For instance, every time a set value changing instruction is inputted, the off-timer time displayed on the screen changes through predetermined steps (For instance, the off-timer time becomes longer every time the set value changing instruction is inputted, and after the off-timer time reaches a maximum value, the off-timer time returns to a minimum value.). If the state without inputting of the same operation-inducing event continues for three seconds for examples, the on-screen display disappears.

In the event that the prior art television apparatus described above is equipped with a speech recognition function, a speech recognition unit is capable of recognizing all units of language which are included in a dictionary (which contains all units of language). However, if the television apparatus is capable of operating always in accordance with an inputted instruction (including a unit of language), as a user wrongly inputs an inappropriate instruction (including a unit of language) under the current mode, the television apparatus executes undesired operations. For example, while a terrestrial television program is being shown (terrestrial broadcast receiving mode), if the displayed picture switches to a BS broadcast television program (BS (Broadcasting Satellite) broadcast receiving mode) after a user merely inputs the program name of the BS broadcast television program as speech without inputting a particular instruction (including a unit of language) which demands switching from the terrestrial television program to the BS broadcast television program, the user may get confused as to which broadcast the user is watching now.

The present invention therefore aims at providing a television apparatus equipped with speech recognition function which appropriately responds or does not respond to a unit of language which is inputted as a speech input under the current operation mode.

The present invention has been made in light of the problems described above, and accordingly, an object of the present invention is to provide a television apparatus comprising a speech recognition function which makes the television apparatus actually operates based on a result of a judgment on the current operation mode and which notifies a user of an operation status.

The present invention also aims at providing a television apparatus equipped with speech recognition function which appropriately responds or does not respond to a unit of language which is inputted as a speech input in accordance with a user's selection.

The remote controller of the prior art television apparatus comprises a limited number of buttons (switches). These buttons (buttons which are expressed as numerical values such as 1, 2 and 3) are correlated with different options in accordance with the content of an on-screen display of the television apparatus. For example, the numerical values representing the respective buttons denote broadcasting channel numbers or option numbers assigned to options in a menu which is displayed on the screen. When a user desires to select a program for instance from within a rich variety of menus which have hierarchical structures for the respective categories, the user is required to search for and identify the desired program while changing the content of the on-screen display through various layers in the hierarchical structures or through various categories. This presents a problem that the richer the menus are, the more complex operations the remote controller requires and hence the longer the operations become.

In the case of the prior art television apparatus, there is a limitation on the number of switches which can be disposed on an operation panel of the remote controller which has a certain surface area. There is also another problem that it takes long for a user to find a necessary switch from among many switches if there are too many switches. It is extremely complicated and therefore impractical to input an instruction to the television apparatus through a key board which is used for a personal computer.

A television apparatus according to the present invention which comprises a speech recognition unit and accordingly accepts an input of a unit of language by speech can accept many types of units of language without limited by the restrictions described above.

The present invention allows to make an efficient use of such a speech recognition function. The present invention aims at providing a television apparatus equipped with speech recognition function which automatically detects and displays a desired program or a program close to what is desired in a prompt manner without switching among complex menus.

Many television apparatuses show a picture demanding or allowing a user to input an instruction (including a unit of language) or guiding a user regarding an inputting method on the screen for a predetermined period of time (which is an on-screen display).

As a user presses an up button or a down button for the speech output level, the speech output level of the television apparatus is displayed on the screen. While the speech level is displayed on the screen, pressing the up button or the down button, the user can set up or change the speech output level.

Assume that the off-timer time is changed as the user pronounces "Off-timer" for instance. Assume further that the off-timer time is currently set to thirty minutes for example. The user pronounces "Off-timer," and the current set value (30 min) of off-timer is then displayed on the screen. Unless a next unit of language for changing the setting is inputted within a predetermined period of time (three seconds for example), this display screen will disappear. The user is allowed to input a unit of language for changing the setting only while this screen remains displayed. However, in general, the duration of utterance of the speech and a period of time since utterance of the speech until utterance of next speech are much longer than the duration of pressing of a button on the remote controller and a period of time since pressing of the button until pressing of a next button. If the user pronounces "Off-timer" the next time in a slight delay, three seconds (display time) will soon elapse and the on-screen display will disappear. When the user pronounces "Off-timer" after the on-screen display disappears, the off-timer time does not change. In the event that setting is changed using a speech recognition function in this manner, the change of the setting takes longer than where the setting is changed by pressing switches. The display time for a prior art on-screen display is too short to change the setting using a speech recognition function.

However, if the display time of an on-screen display is uniformly extended so that setting can be changed comfortably using a speech recognition function, another problem will arise that when a user presses a switch to change the setting, the on-screen display remains for a while even after completion of change in setting and the user accordingly gets irritated.

Accordingly, an object of the present invention is to provide a television apparatus equipped with speech recognition function which permits a user to comfortably change settings both by means of the speech recognition function and pressing of a switch.

SUMMARY OF THE INVENTION

To solve the problems described above, the present invention comprises the following structures.

A television apparatus equipped with speech recognition function according to one aspect of the present invention is characterized in comprising: a speech recognition unit which receives speech and recognizes a unit of language included in the speech; and a judging unit which judges whether the television apparatus can operate under the current operation mode in accordance with the unit of language, wherein the television apparatus operates in accordance with the unit of language when it is possible for the television apparatus to operate under the current operation mode in accordance with the unit of language, but the television apparatus does not operate in accordance with the unit of language when it is not possible for the television apparatus to operate under the current operation mode in accordance with the unit of language.

The meaning of "operates in accordance with the unit of language" includes execution of the unit of language (for instance, turning on of a power source in accordance with a unit of language reading, "Turn on the power.") and execution of a necessary action to realize the unit of language (e.g., to select, input and display a soccer program in accordance with a unit of language "soccer" or to generate and display a table of soccer programs which can be shown).

The above-mentioned television apparatus equipped with speech recognition function according to other aspect of the present invention is characterized in that the television apparatus comprises a first input mode and a second input mode which can be switched with each other, the operation according to claim 1 is performed under the first input mode, while under the second input mode, when it is not possible for the television apparatus to operate under the current operation mode in accordance with the unit of language, the television apparatus operates in accordance with the unit of language after the operation mode is changed.

An example will now be described that the current operation mode is the terrestrial broadcast receiving mode and that a user inputs a unit of language "soccer" to the television apparatus but there is no soccer match broadcasted on any channel on terrestrial broadcasting waves at that time. Under the first input mode, the television apparatus does not show anything. Under the second input mode, if there is a soccer match broadcasted on a BS wave, the operation mode is switched to the BS broadcast receiving mode and the soccer match is then shown.

The television apparatus equipped with speech recognition function according to a different aspect of the present invention is characterized in comprising: a speech recognition unit which receives speech and recognizes a unit of language included in the speech; a judging unit which judges whether the television apparatus can operate under the current operation mode in accordance with the unit of language; a dictionary containing classifications by category, a dictionary containing classifications by category and having a hierarchical structure, or a dictionary in which units of language are correlated with each other using key words; and a search unit which retrieves, from within the dictionary, other unit of language which belongs to the same category as the unit of language and which can make the television apparatus operate, other unit of language which has a superordinate concept beyond the unit of language and which can make the television apparatus operate, or other unit of language which is correlated with the unit of language by a key word and which can make the television apparatus operate, when it is not possible for the television apparatus to operate in accordance with the unit of language, wherein when the search unit retrieves other unit of language, the television apparatus operates in accordance with other unit of language. The search unit preferably retrieves other unit of language which can be executed under the current operation mode.

The "dictionary containing classifications by category" is a table of programs which are classified under the respective categories such as news and reports. The "dictionary having a hierarchical structure" is a dictionary (e.g., a program table) which contains categories (sports, for instance) classified by superordinate concept for example, and in such a dictionary, at least one superordinate concept category (sports, for instance) comprises categories (e.g., baseball, soccer, etc.) classified in accordance with a plurality of subordinate concepts. There may be any desired number of hierarchical layers. The "dictionary in which units of language are correlated with each other using key words" is a table of programs each of which is correlated with a key word (e.g., baseball, soccer, etc.) for instance. Programs correlated with each other using a key word are a plurality of programs to which the same key word is assigned, for example.

The above-mentioned television apparatus equipped with speech recognition function according to a different aspect of the present invention is characterized in further comprising an on-screen display unit and/or a speech outputting unit, wherein when it is not possible for the television apparatus to operate under the current operation mode in accordance with the unit of language, the on-screen display unit and/or the speech outputting unit provides a user with a notice which denotes that it is not possible for the television apparatus to operate in accordance with the unit of language.

The above-mentioned television apparatus equipped with speech recognition function according to a different aspect of the present invention is characterized in further comprising an on-screen display unit and/or a speech outputting unit, wherein when the television apparatus operates in accordance with the unit of language after changing the operation mode, the on-screen display unit and/or the speech outputting unit provides a user with a notice which denotes that the television apparatus will operate in accordance with the unit of language after changing the operation mode.

The above-mentioned television apparatus equipped with speech recognition function according to a different aspect of the present invention is characterized in further comprising an on-screen display unit and/or a speech outputting unit, wherein when the television apparatus operates in accordance with other unit of language, the on-screen display unit and/or the speech outputting unit provides a user with a notice which denotes that the television apparatus will operate in accordance with other unit of language.

The above-mentioned television apparatus equipped with speech recognition function according to a different aspect of the present invention is characterized in further comprising an on-screen display unit and/or a speech outputting unit. When it is not possible for the television apparatus to operate under the current operation mode in accordance with the unit of language, the on-screen display unit and/or the speech outputting unit displays a selection menu containing the first input mode and the second input mode, and the television apparatus operates under the input mode which is selected by the user.

The television apparatus equipped with speech recognition function according to a different aspect of the present invention is characterized in comprising: an on-screen display unit which demands or permits a user to input an instruction, or displays a screen for guiding the user about an inputting method for a predetermined display time; a speech recognition unit which receives speech and recognizes a unit of language included in the speech; and a operation inputting unit which accepts an instruction by detecting that the user has pressed a switch, moved a cursor displayed on the screen or touched on a touch panel, wherein the display time for inputting of a unit of language via the speech recognition unit is longer than the display time for inputting of an instruction via the operation inputting unit.

A method of controlling a television apparatus equipped with speech recognition function according to a different aspect of the present invention is a method of controlling a television apparatus equipped with speech recognition function which comprises a dictionary containing classifications by category, a dictionary containing classifications by category and having a hierarchical structure, or a dictionary in which units of language are correlated with each other using key words. The method is characterized in comprising: a speech recognition step of receiving speech and recognizing a unit of language included in the speech; a judging step of judging whether the television apparatus can operate in accordance with the unit of language; a search step of retrieving, from within the dictionary, other unit of language which belongs to the same category as the unit of language and which can make the television apparatus operate, other unit of language which has a superordinate concept beyond the unit of language and which can make the television apparatus operate, or other unit of language which is correlated with the unit of language by a key word and which can make the television apparatus operate, when it is not possible for the television apparatus to operate in accordance with the unit of language; and an operation step of operating in accordance with other unit of language, when the search unit retrieves other unit of language.

A method of controlling a television apparatus equipped with speech recognition function according to a different aspect of the present invention is characterized in comprising: an on-screen displaying step of demanding or permitting a user to input an instruction, or displaying a screen for guiding the user about an inputting method for a predetermined display time; a speech recognition step of receiving speech of the user and recognizing a unit of language included in the speech; and a operation inputting step of detecting that the user has pressed a switch, moved a cursor displayed on the screen or touched on a touch panel, and thereby accepting an instruction, wherein the display time for inputting of a unit of language at the speech recognition step is longer than the display time for inputting of an instruction at the operation inputting step.

While the novel features of the present invention are those particularly pointed out in the attached CLAIMS, both the structure and the content of the present invention as well as other objects and features of the present invention will be well understood and evaluated from the following detained description when taken in conjunction with the correlated drawings.

BRIEF DESCRIPTION OF THE DRAWINGS

FIG. 4 is a drawing which shows one example of a category list of BS broadcasts (2-layer) for the television apparatus equipped with speech recognition function according to the preferred embodiment 2 of the present invention;

FIG. 10 is a drawing of display messages and differences in category information between terrestrial analog broadcasts and BS digital broadcasts for the television apparatus equipped with speech recognition function according to the preferred embodiment 5 of the present invention;

FIG. 11 is a screen transition diagram regarding displaying of a message 2 by the television apparatus equipped with speech recognition function according to the preferred embodiment 5 of the present invention;

FIG. 19 is a drawing which shows one example of a category dictionary of the television apparatus equipped with speech recognition function according to the preferred embodiment 2 of the present invention;

FIG. 21 is a drawing which shows one example of a key word list for categories used in the television apparatus equipped with speech recognition function according to the preferred embodiment 4 of the present invention; and FIG. 22 is a screen transition diagram for by-category program search by means of operations given through a remote controller of a prior art television apparatus.

All or some drawings merely illustrate the outline for an illustrative purpose, and therefore, it should be noted that the drawings may not necessarily illustrate actual relative sizes, locations, etc., of the illustrated elements.

DETAILED DESCRIPTION OF THE INVENTION

Preferred embodiments specifically expressing the best mode for implementing the present invention will now be described with reference to the correlated drawings.

Preferred Embodiment

Figure 1:
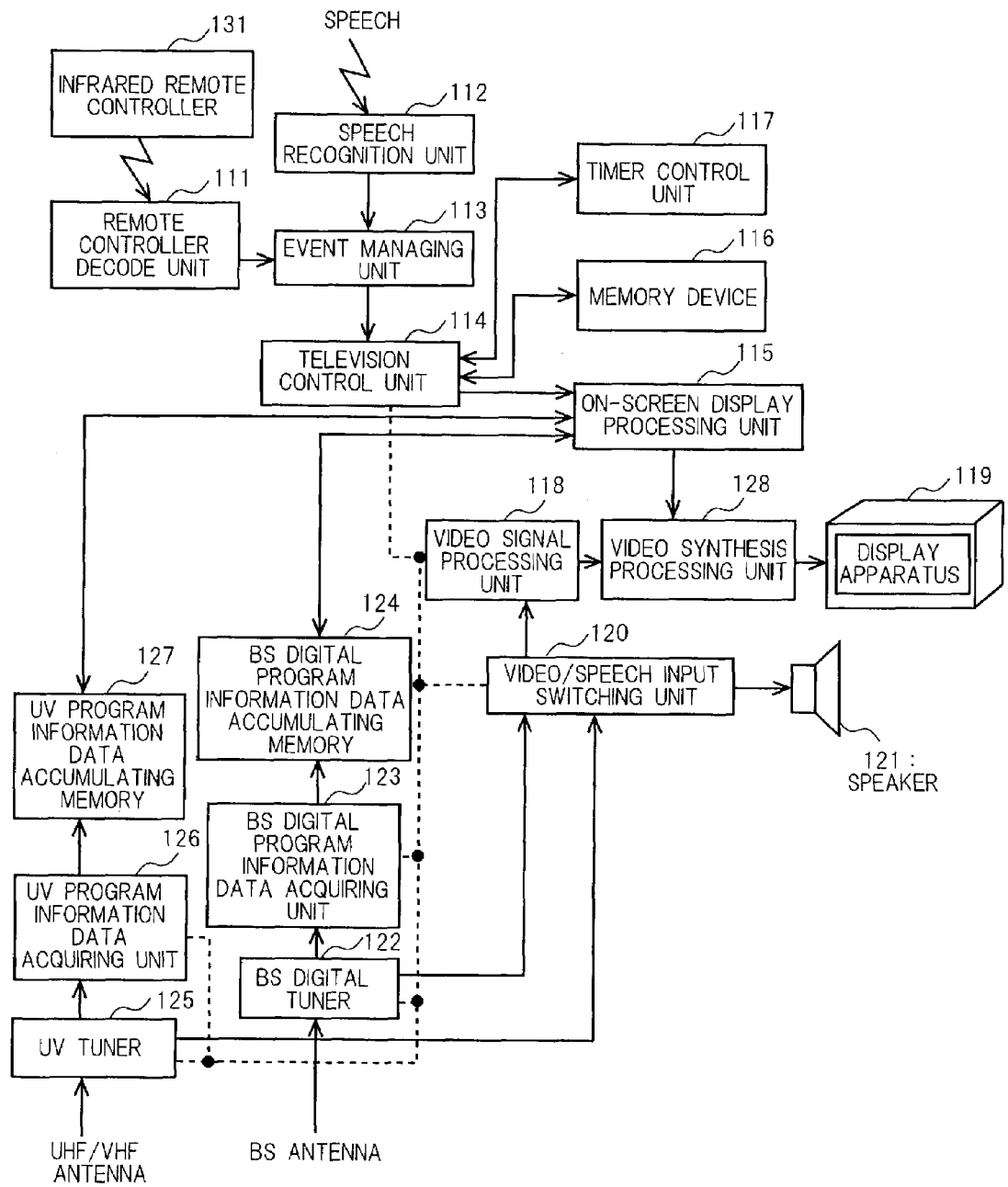
FIG. 1 is a block diagram showing a structure of a television apparatus equipped with speech recognition function according to a preferred embodiment of the present invention.
Figure 2:
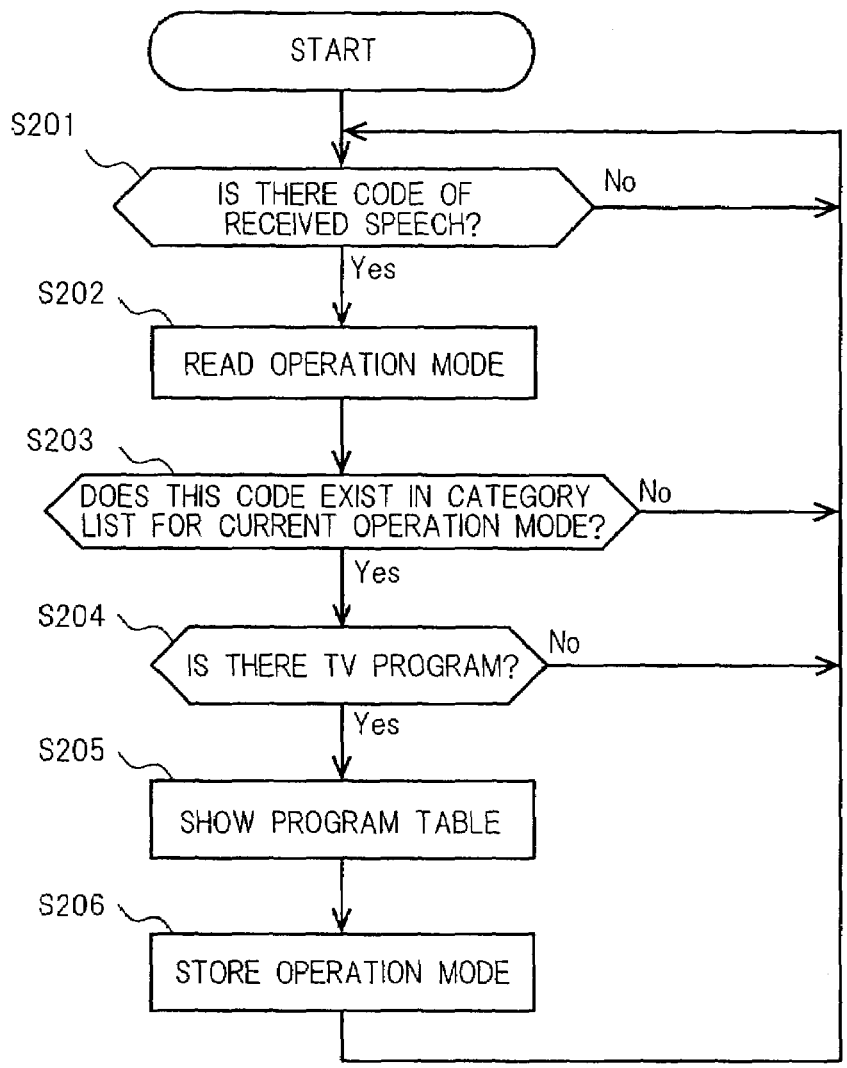
FIG. 2 is a flow chart showing by-category program search processing performed using a speech input in the television apparatus equipped with speech recognition function according to a preferred embodiment 1 of the present invention.

A television apparatus equipped with speech recognition function according to a preferred embodiment 1 of the present invention will now be described with reference to FIGS. 1 and 2.

First, a structure of the television apparatus equipped with speech recognition function according to the preferred embodiment 1 will be described. FIG. 1 is a block diagram showing the structure of the television apparatus equipped with speech recognition function according to the preferred embodiment 1 of the present invention.

The television apparatus equipped with speech recognition function according to the preferred embodiment 1 comprises a remote controller decode unit 111 which decodes a transmit code from an infrared remote controller 131, a speech recognition unit 112 which recognizes speech (unit of language) uttered by a user and decodes the unit of language, an UV tuner (UHF (Ultra High Frequency) and VHF (Very High Frequency) tuner) 125 which receives a video/speech signal for terrestrial broadcasting, an UV program information data acquiring unit 126 which acquires UV program information data from the UV tuner 125, a UV program information data accumulating memory 127 which accumulates UV program information data, a BS digital tuner 122 which receives a video/speech signal for BS (Broadcasting Satellite) digital broadcasting, a BS digital program information data acquiring unit 123 which acquires BS digital program information data from the BS digital tuner 122, a BS digital program information data accumulating memory 124 which accumulates BS digital program information data, a video/speech input switching unit 120 which switches between the UV tuner 125 and the BS digital tuner 122, a speaker 121 which outputs a speech signal from the video/speech input switching unit 120, a video signal processing unit 118 which processes a video signal from the video/speech input switching unit 120, an event managing unit 113 which receives an event (which is an input of an instruction (including a unit of language) in the preferred embodiment 1) from the remote controller decode unit 111 or the speech recognition unit 112 and judges an origin of event (the remote controller decode unit 111 or the speech recognition unit 112) and the type of the event (an inputted instruction (including a unit of language)), a television control unit 114 which controls the television apparatus based on an event from the event managing unit 113, a memory device 116 which stores operation modes, a timer control unit 117 which manages time, an on-screen display processing unit 115 which provides on-screen display of information received from the BS digital program information data accumulating memory 124 and the UV program information data accumulating memory 127 in response to an instruction from the television control unit 114, a video synthesis processing unit 128 which synthesizes an on-screen display signal outputted from the on-screen display processing unit 115 and a video signal outputted from the video signal processing unit 118, and a display apparatus 119 which displays a video signal outputted from the video synthesis processing unit 128.

The television control unit 114, the video signal processing unit 118, the video/speech input switching unit 120, the UV tuner 125, the UV program information data acquiring unit 126, the BS digital tuner 122 and the BS digital program information data acquiring unit 123 are connected by a control signal line.

Next, a description will now be given on the sequence of control for by-category program search utilizing a speech input in the television apparatus equipped with speech recognition function according to the preferred embodiment 1 which has such a structure described above. FIG. 2 is a flow chart showing by-category program search processing performed using a speech input in the television apparatus equipped with speech recognition function according to the preferred embodiment 1 of the present invention.

The television control unit 114 waits until a unit of language received at the speech recognition unit 112 has been inputted through the event managing unit 113 (S201). Upon inputting of a speech code to the television control unit 114 ("YES" at S201), the television control unit 114 reads out the current operation mode from the memory device 116 (S202). For example, operation modes are a terrestrial broadcast receiving mode and a BS broadcast receiving mode. The current operation mode is the BS broadcast receiving mode for instance.

The television control unit 114 judges whether the inputted unit of language (the speech code) exists in categories for the current operation mode (S203). For example, the unit of language "soccer" is inputted and whether the category of soccer is included in a BS program classification table which contains a plurality of categories stored in the BS digital program information data accumulating memory 124. When there is nothing which corresponds in the category list for the current operation mode (when no operation is possible in accordance with the unit of language (the speech code) under the current operation mode) ("No" at S203), the television control unit 114 returns to a stand-by state to wait for inputting of a next speech code (S201), without permitting any operation.

When the inputted unit of language (the speech code) exists in categories for the current operation mode ("YES" at S203), the television control unit 114 judges whether there is a program in this category under the current operation mode (S204). When there is no corresponding program ("No" at S204), the television control unit 114 returns to the stand-by state to wait for inputting of a next speech code (S201), without permitting any operation.

When there is a program in this category under the current operation mode ("YES" at S204), the television control unit 114 instructs the on-screen display processing unit 115 to generate a program table for this category. The display apparatus 119 displays the program table (e.g., a program table regarding soccer) received from the on-screen display processing unit 115 via the video synthesis processing unit 128 (S205). The television control unit 114 sets up the operation mode (the terrestrial broadcast receiving mode or the BS broadcast receiving mode) in the memory device 116 (S206), and returns to the stand-by state to wait for inputting of a next speech code (S201).

Following this, the user designates a particular program (for instance, a match by Gamba Osaka belonging to the J LEAGUE) from the program table. The television control unit 114 allows the BS digital tuner 122 to input the designated program, and permits the video/speech input switching unit 120 to select the designated program. A video signal representing the designated program is displayed by the display apparatus 119, and the speech signal is outputted from the speaker 121.

As the user directly pronounces the name of the program, the television apparatus directly shows this program if it is possible to show the program under the current operation mode, but does not show the program if it is not possible to show.

As described above, according to the preferred embodiment 1 of the present invention, the current operation mode is judged and an operation is executed when a recognized unit of language can activate the operation, but the operation is not executed when the recognized unit of language can not activate the operation.

Preferred Embodiment

A television apparatus equipped with speech recognition function according to a preferred embodiment 2 of the present invention will now be described with reference to FIGS. 1 and 3 through 6.

First, a structure of the television apparatus equipped with speech recognition function according to the preferred embodiment 2 will be described. Since a block diagram (FIG. 1) showing the structure of the television apparatus equipped with speech recognition function according to the preferred embodiment 2 of the present invention is similar to that used for the preferred embodiment 1, a detailed description will not be given.

Figure 3:
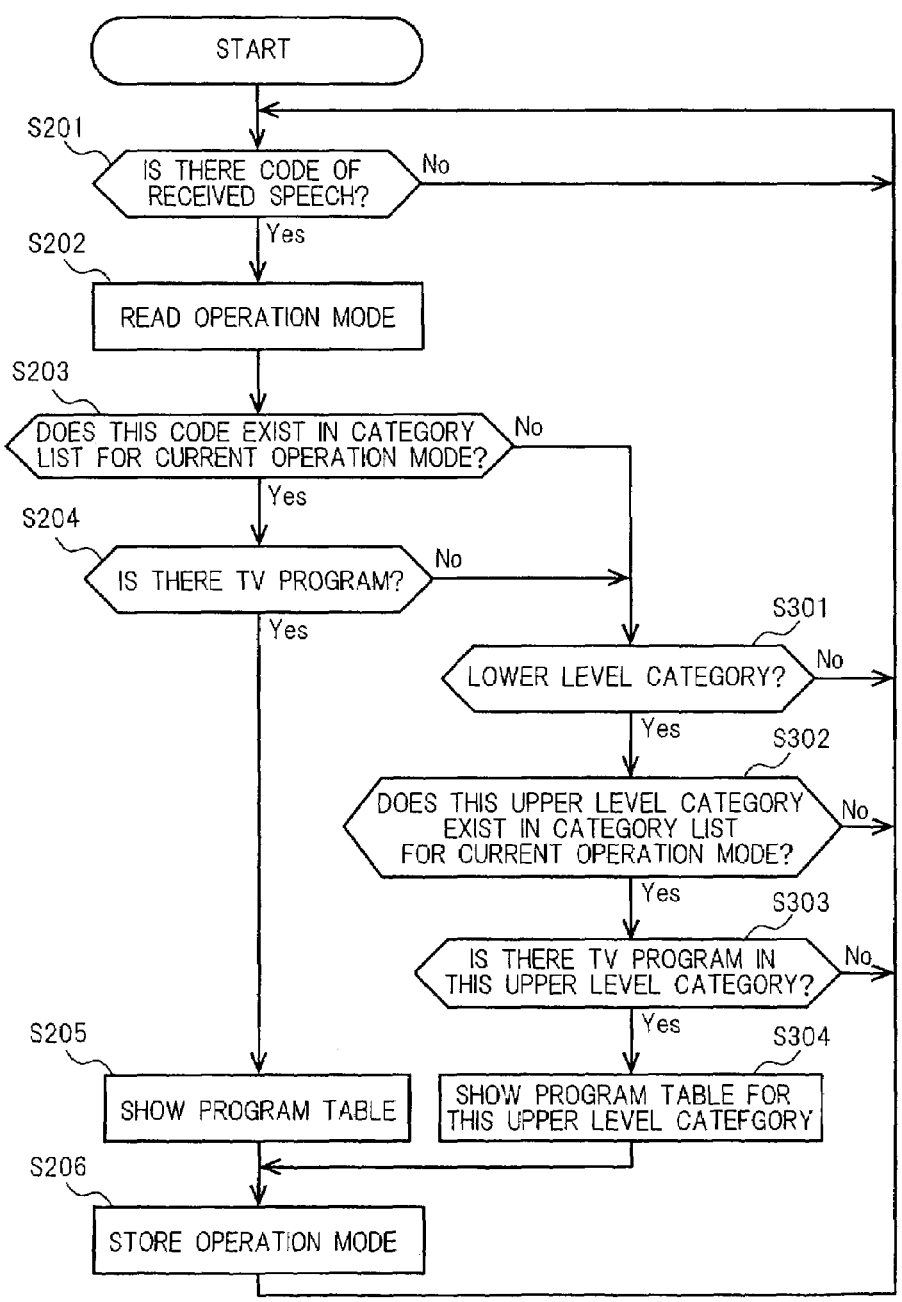
FIG. 3 is a flow chart showing by-category program search processing performed using a speech input in the television apparatus equipped with speech recognition function according to a preferred embodiment 2 of the present invention.

Next, a description will be given on the sequence of control for by-category program search utilizing a speech input in the television apparatus equipped with speech recognition function according to the preferred embodiment 2 which has such a structure described above. The preferred embodiment 2 is different from the preferred embodiment 1 in terms of processing for a case that a received unit of language does not exist in a category for the current operation mode and that there is not a program which belongs to this category under the current operation mode. The preferred embodiment 2 is otherwise the same as the preferred embodiment 1. FIG. 3 is a flow chart showing by-category program search processing performed using a speech input in the television apparatus equipped with speech recognition function according to the preferred embodiment 2 of the present invention. In FIG. 3, steps (S201 through S206) denoted at the same reference symbols as those used in FIG. 2 require to execute similar processing to that shown in FIG. 2, and therefore, will not described again. Those portions which constitute a characteristic of the preferred embodiment 2 will be denoted at new reference symbols (S301 through S306) and will now be described.

When a unit of language (the speech code) inputted at the step S203 does not exist in a category list for the current operation mode ("No" at S203) and there is not a program which belongs to this category under the current operation mode at the step S204 ("No" at S204), the television control unit 114 judges whether the inputted unit of language belongs to a lower level category (S301). To be more specific, the television control unit 114 judges whether the inputted unit of language exists in a category dictionary which is stored in the memory device 116 (FIG. 19 (a large dictionary containing units of language which are not registered in a category list for BS digital broadcasts and a category list for terrestrial broadcasts shown in FIG. 4)) and which belongs to a lower level category in the category dictionary. When the inputted unit of language does not exist in the category dictionary or exists in the category dictionary but belongs to an upper level category ("No" at S301), the television control unit 114 returns to the stand-by state (S201) to wait for inputting of a next speech code without permitting any operation.

When the inputted unit of language exists in the category dictionary and belongs to a lower level category ("YES" at S301), the television control unit 114 judges whether the upper level category beyond the inputted unit of language exists among categories for the current operation mode (S302). When the upper level category does not exist among the categories for the current operation mode ("No" at S302), the television control unit 114 returns to the stand-by state (S201) to wait for inputting of a next speech code without permitting any operation.

When the upper level category exists among the categories for the current operation mode ("YES" at S302), the television control unit 114 judges whether there is a program which belongs to the upper level category under the current operation mode (S303). When there is not such a program ("No" at S303), the television control unit 114 returns to the stand-by state (S201) to wait for inputting of a next speech code without permitting any operation.

When there is such a program ("YES" at S303), the television control unit 114 instructs the on-screen display processing unit 115 to generate a program table for this upper level category. The display apparatus 119 displays the program table received from the on-screen display processing unit 115 via the video synthesis processing unit 128 (S304). The television control unit 114 sets up the operation mode (the terrestrial broadcast receiving mode or the BS broadcast receiving mode) in the memory device 116 (S206), and returns to the stand-by state to wait for inputting of a next speech code (S201).

Following this, the user designates a particular program from the program table. The television control unit allows inputting of the designated program, and permits the display apparatus 119 to display the program.

Next, a specific example will be described.

Figure 5:
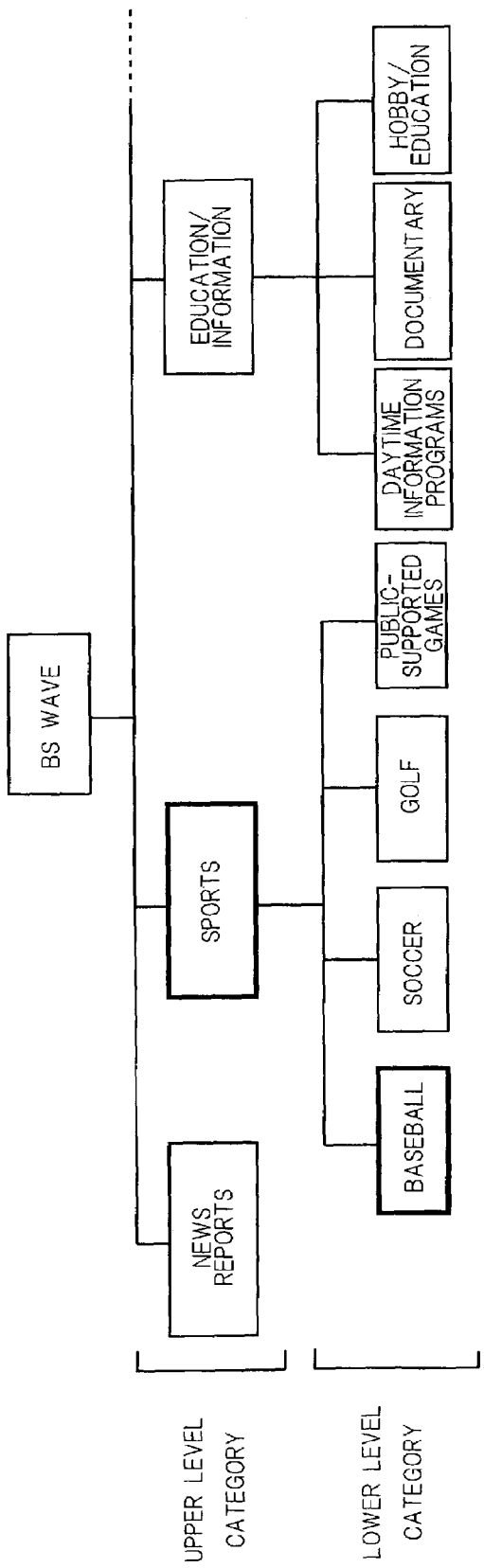
FIG. 5 is a drawing which shows, as a hierarchical structure, one example of a category list of BS waves shown in FIG. 4.

The BS digital program information data accumulating memory 124 and the UV program information data accumulating memory 127 comprise category lists for the respective operation modes (the BS broadcast receiving mode and the terrestrial broadcast receiving mode). FIG. 4 is a drawing which shows one example of a category list of BS waves stored in the BS digital program information data accumulating memory 124 of the television apparatus equipped with speech recognition function according to the preferred embodiment 2 of the present invention. FIG. 5 is a drawing which shows, as a hierarchical structure, one example of a category list of the BS waves which are shown in FIG. 4. As FIGS. 4 and 5 show, categories comprise upper level categories and lower level categories. The categories are first classified into the upper level categories some of which are further classified into the lower level categories.

A description will now be given on a case that the user pronounces "baseball" for by-category program search when the television apparatus is currently under an operation mode for receiving BS waves (the BS broadcast receiving mode).

The speech recognition unit 112, receiving the speech pronouncing "baseball," sends a speech code representing "baseball" to the television control unit 114 via the event managing unit 113. The television control unit 114 judges whether there is "baseball" among categories for BS waves (S203 in FIG. 3). "BASEBALL" exists in the category list (FIG. 4) regarding BS waves ("YES" at S203 in FIG. 3). The television control unit 114 then judges whether there is a baseball program which is currently being broadcasted (S204 in FIG. 3).

When there is not such a program ("No" at S204 in FIG. 3), whether "BASEBALL" belongs to lower level categories (S301 in FIG. 3). As shown in FIG. 5, "BASEBALL" is a lower level category under the upper level category "SPORTS" ("YES" at S301 in FIG. 3). The upper level category "SPORTS" exists in the category list of BS waves ("YES" at S302 in FIG. 3). The television control unit 114 judges whether there is a sports program which is currently being broadcasted (S303 in FIG. 3). When there is a sports program such as a soccer or basketball program ("YES" at S303 in FIG. 3), the display apparatus 119 displays a program table regarding this sport.

The BS digital program information data accumulating memory 124 and the UV program information data accumulating memory 127 may comprise a program list which classifies into categories not only information regarding programs which can be currently received but also programs which can be enjoyed only during a predetermined period (which is eight days from now for instance). As the user directly pronounces the name of a program, the television apparatus directly shows the demanded program if it is possible for the television apparatus to show the program under the current operation mode. When it is not possible to show the program under the current operation mode and the name of the program is contained in the program list, the television apparatus displays a list of programs belonging to a category having a subordinate concept to which this program belongs. When there is not a program which belongs to the category of the subordinate concept to which this program belongs, the television apparatus displays a list of programs belonging to a category having a superordinate concept to which this category belongs.

As described above, according to the preferred embodiment 2, the current operation mode is judged, and when a recognized unit of language can not make the television apparatus operate, a superordinate concept which covers the recognized unit of language makes the television apparatus operate. In general, when it is not possible to watch a particular program or a program belonging to a particular category, the user often wishes to watch other program which is included in the same superordinate concept to which the desired program belongs. When the program desired by the user is not being broadcasted, even without providing the next input, the user is automatically allowed at once to watch a list of other programs whose contents are close to that of the desired program.

According to the preferred embodiment 2, a program which the user can watch or a list of programs which the user can watch is displayed under a condition that the current operation mode will not be changed. Instead, a program which the user can watch or a list of programs which the user can watch not only under the current operation mode but under other operation mode as well may be displayed. For instance, when the user utters the unit of language "soccer," a list of programs is automatically generated which contains soccer programs on terrestrial waves and soccer programs on BS waves and is then displayed by the display apparatus 119. When the current operation mode is the BS broadcast receiving mode, as the user inputs an instruction (including a unit of language) for selecting a terrestrial broadcasting program (as the user pronounces the name of a terrestrial broadcasting program for instance), the terrestrial broadcast receiving mode automatically takes over and the demanded program is shown.

Although the hierarchical structure of the category list is a 2-layer structure containing the upper level categories and the lower level categories according to the preferred embodiment 2, the hierarchical structure may include three or more layers.

Figure 6:
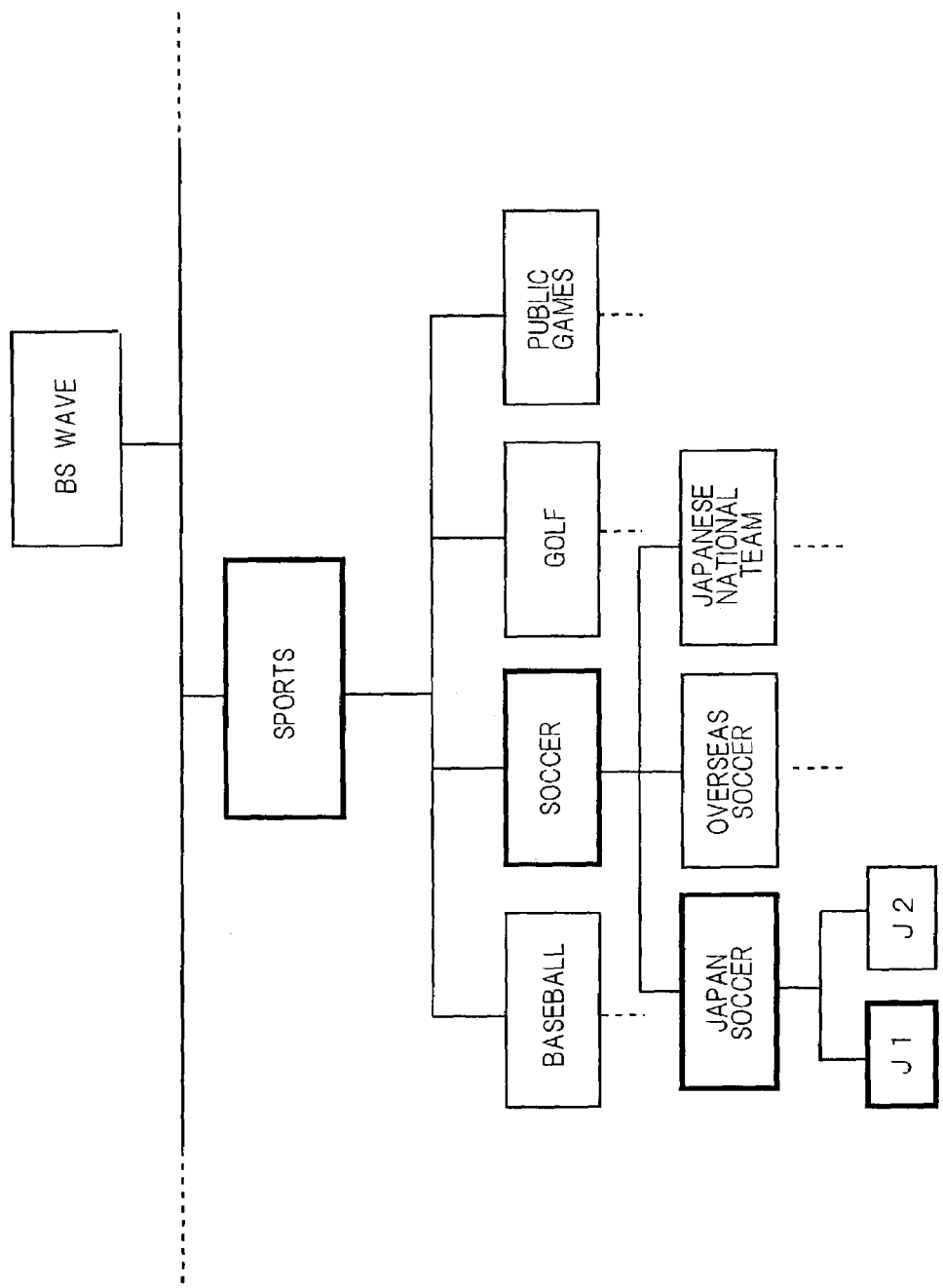
FIG. 6 is a drawing which shows one example of a category list of BS broadcasts (4-layer) for the television apparatus equipped with speech recognition function according to the preferred embodiment 2 of the present invention.

Use of a 4-layer structure as that shown in FIG. 6 will now be described. For selection of "J1" through operations of a button on the remote controller, it is necessary to make four selections starting from an upper level category, like "SPORTS"—"SOCCER"—"JAPAN SOCCER"—"J1." However, when "J1" is to be selected by speech, merely pronouncing "J1" will immediately realizes the selection. A television apparatus according to the prior art techniques which requires to select a program using switches of the remote controller and a guidance screen displayed on the display has a problem that as the hierarchical structure becomes more complex, operations become extremely complicated to an impractical extent. According to the preferred embodiment 2, it becomes easier for a user to narrow down to a wanted program as the number of the layers increases, which on the contrary shortens a period of time needed to make selections. As the number of the layers increases, speech-based selections become more effective in this manner.

An increase in the number of the layers increases the number of categories, thereby making it difficult for a user to accurately remember the names of the categories. This also increases a possibility that there will be no television programs belonging to those categories which are currently being broadcasted. When using the television apparatus according to the preferred embodiment 2, a user who finds it bothersome to remember the names of all categories may remember only the names of categories which belong to a superordinate concept, and as the user provides a speech input, the user can easily execute program search. If there is not a program which belongs to a category of a subordinate concept which covers the speech input, a list of television programs belonging to categories of superordinate concepts is automatically displayed. In the event that the television apparatus according to the preferred embodiment 2 is used, even if the hierarchies are made more complex, this does not easily lead to an obstacle which will otherwise occur.

In the example described above, the preferred embodiment 2 realizes an even more useful effect.

Preferred Embodiment

Figure 7:
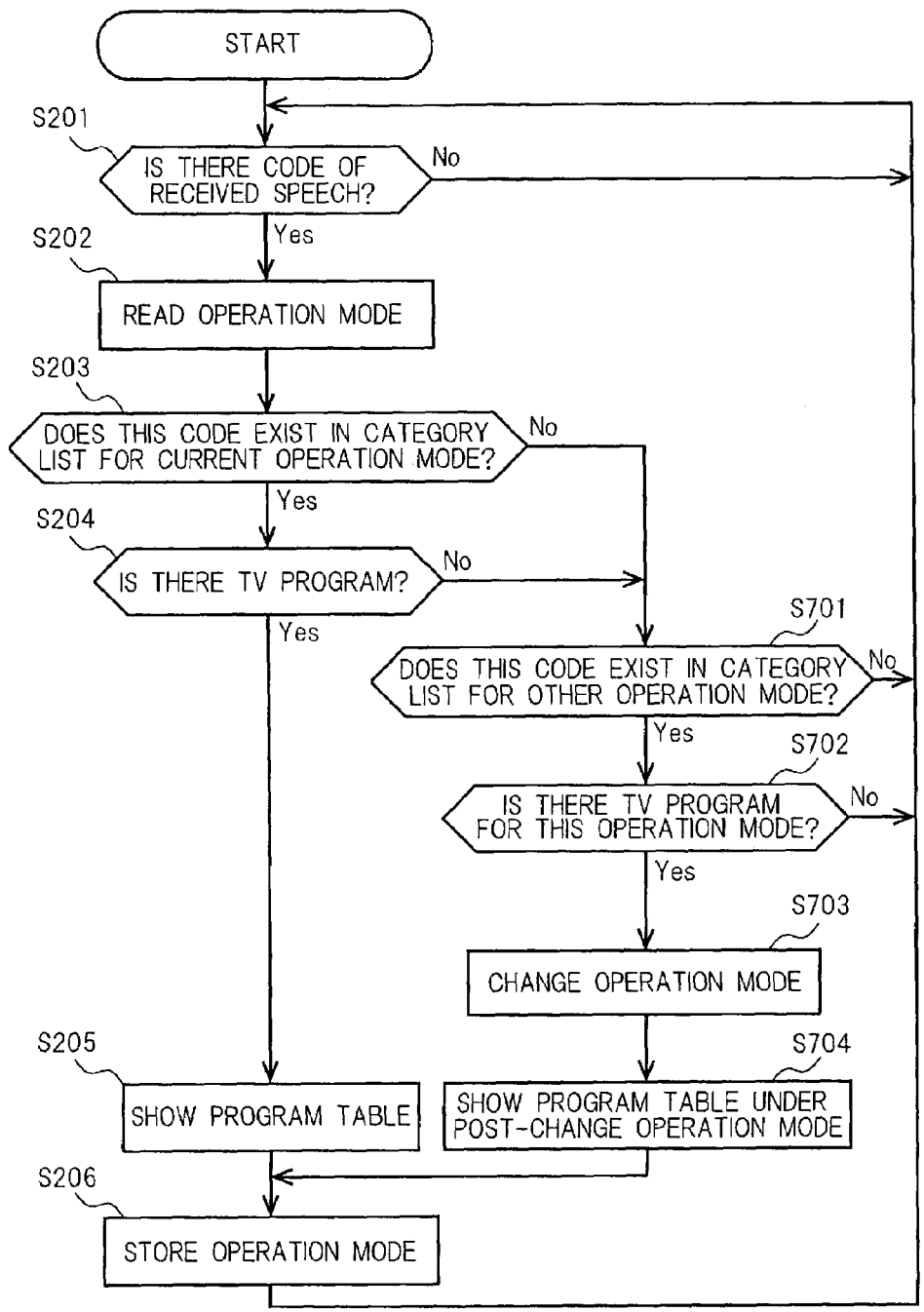
FIG. 7 is a flow chart showing by-category program search processing performed using a speech input in the television apparatus equipped with speech recognition function according to a preferred embodiment 3 of the present invention.

A television apparatus equipped with speech recognition function according to a preferred embodiment 3 of the present invention will now be described with reference to FIGS. 1 and 7.

First, a structure of the television apparatus equipped with speech recognition function according to the preferred embodiment 3 will be described. Since a block diagram (FIG. 1) showing the structure of the television apparatus equipped with speech recognition function according to the preferred embodiment 3 of the present invention is similar to that used for the preferred embodiment 1, a detailed description will not be given.

Next, a description will be given on the sequence of control for by-category program search utilizing a speech input in the television apparatus equipped with speech recognition function according to the preferred embodiment 3 which has such a structure described above. The preferred embodiment 3 is different from the preferred embodiment 2 in terms of processing for a case that a received unit of language does not exist in a category for the current operation mode and that there is not a program which belongs to this category under the current operation mode. The preferred embodiment 3 is otherwise the same as the preferred embodiment 2. FIG. 7 is a flow chart showing by-category program search processing performed using a speech input in the television apparatus equipped with speech recognition function according to the preferred embodiment 3 of the present invention. In FIG. 7, steps (S201 through S206) denoted at the same reference symbols as those used in FIG. 2 require to execute similar processing to that shown in FIG. 2, and therefore, will not described again. Those portions which constitute a characteristic of the preferred embodiment 3 will be denoted at new reference symbols (S701 through S704) and will now be described.

When a unit of language (the speech code) inputted at the step S203 does not exist in a category list for the current operation mode ("No" at S203) and there is not a program which belongs to this category under the current operation mode at the step S204 ("No" at S204), the television control unit 114 judges whether the inputted unit of language (the speech code) exists in a category list for other operation mode (S701). When the inputted unit of language is not in the category list for the other operation mode ("No" at S701), the television control unit 114 returns to the stand-by state (S201) to wait for inputting of a next speech code without permitting any operation.

When the inputted unit of language (the speech code) is in the category list for the other operation mode ("YES" at S701), the television control unit 114 judges whether there is a program in this category under the other operation mode (S702). When there is not such a program ("No" at S702), the television control unit 114 returns to the stand-by state (S201) to wait for inputting of a next speech code without permitting any operation.

When there is such a program ("YES" at S702), the television control unit 114 switches to the other operation mode from the current operation mode (S703). The television control unit 114 instructs the on-screen display processing unit 115 to generate a program table corresponding to this category under the other operation mode. The display apparatus 119 displays the program table received from the on-screen display processing unit 115 via the video synthesis processing unit 128 (S704). The television control unit 114 sets up the operation mode (the terrestrial broadcast receiving mode or the BS broadcast receiving mode) in the memory device 116 (S206), and returns to the stand-by state to wait for inputting of a next speech code (S201).

Following this, the user designates a particular program from the program table. The television control unit allows inputting of the designated program, and permits the display apparatus 119 to display the program.

As described above, according to the preferred embodiment 3 of the present invention, the current operation mode is judged, and when a recognized unit of language can not make the television apparatus operate, the operation mode is changed and the recognized unit of language makes the television apparatus operate.

In the preferred embodiment 3, when the television apparatus can not operate even after changing the operation mode, the television apparatus may operate in accordance with a superordinate concept which covers a recognized unit of language as in the preferred embodiment 2. Further, when the television apparatus can not operate in accordance with a superordinate concept which covers a recognized unit of language in the preferred embodiment 2, the operation mode may be changed as in the preferred embodiment 3 to thereby make it possible for the television apparatus to operate in accordance with the recognized unit of language.

The television apparatus may be equipped with a first input mode of activating no operation to deal with a situation that it is impossible to execute a unit of language fed as a speech input under the current operation mode, and also with a second input mode which requires to change the operation mode and execute an operation to deal with a situation that it is impossible to execute a unit of language fed as a speech input under the current operation mode but it is possible to execute the inputted unit of language after changing the operation mode, so that the television apparatus can operate under the input mode of a user's choice.

Preferred Embodiment

Figure 20:
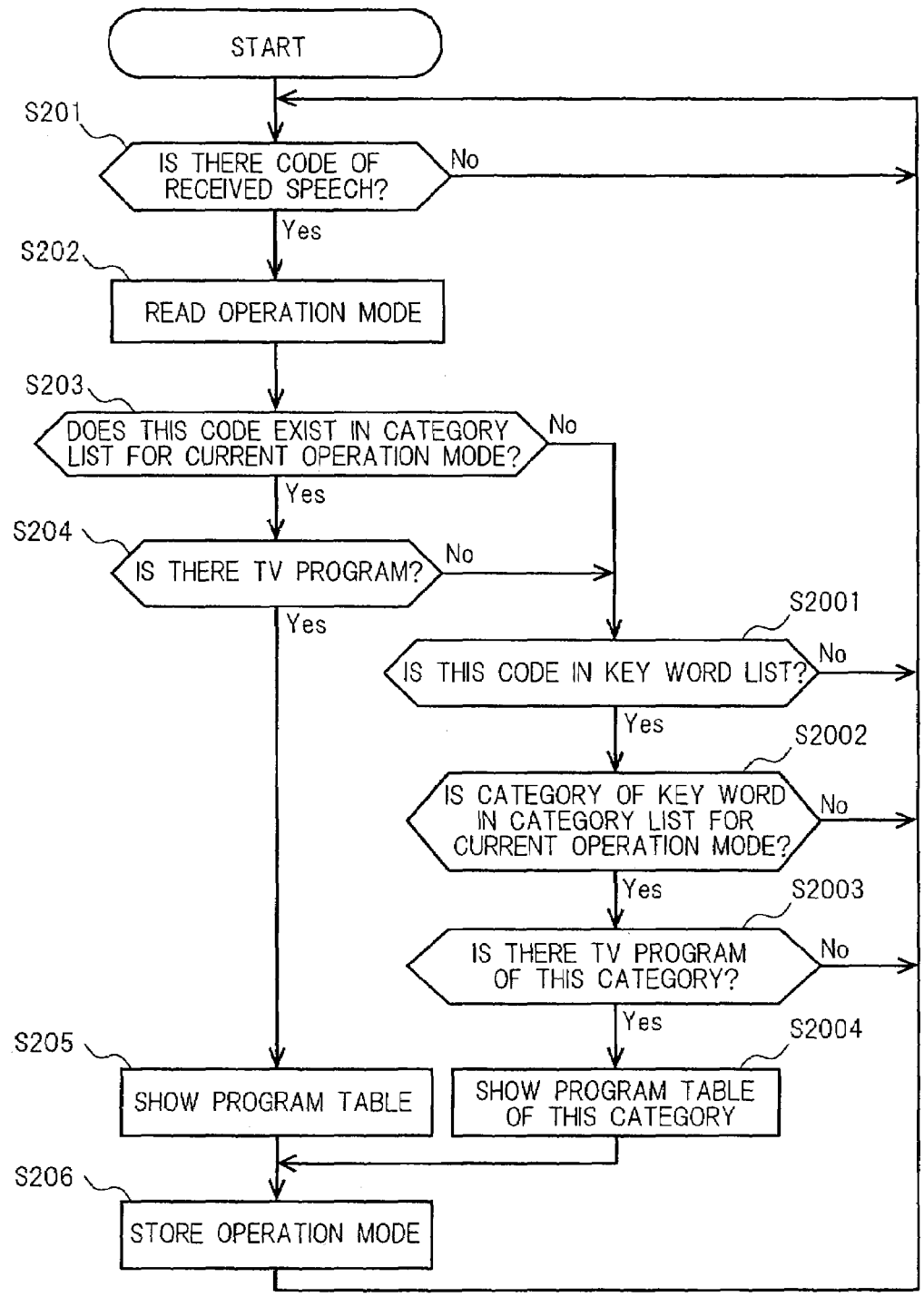
FIG. 20 is a flow chart showing by-category program search processing performed using a speech input in the television apparatus equipped with speech recognition function according to the preferred embodiment 4 of the present invention.

A television apparatus equipped with speech recognition function according to a preferred embodiment 4 of the present invention will now be described with reference to FIGS. 1, 20 and 21.

First, a structure of the television apparatus equipped with speech recognition function according to the preferred embodiment 4 will be described. Since a block diagram (FIG. 1) showing the structure of the television apparatus equipped with speech recognition function according to the preferred embodiment 4 of the present invention is similar to that used for the preferred embodiment 1, a detailed description will not be given.

Next, a description will be given on the sequence of control for by-category program search utilizing a speech input in the television apparatus equipped with speech recognition function according to the preferred embodiment 4 which has such a structure described above. The preferred embodiment 4 is different from the preferred embodiment 3 in terms of processing for a case that a received unit of language does not exist in a category for the current operation mode and that there is not a program which belongs to this category under the current operation mode. The preferred embodiment 4 is otherwise the same as the preferred embodiment 3. FIG. 20 is a flow chart showing by-category program search processing performed using a speech input in the television apparatus equipped with speech recognition function according to the preferred embodiment 4 of the present invention. In FIG. 20, steps (S201 through S206) denoted at the same reference symbols as those used in FIG. 2 require to execute similar processing to that shown in FIG. 2, and therefore, will not described again. Those portions which constitute a characteristic of the preferred embodiment 4 will be denoted at new reference symbols (S2001 through S2004) and will now be described.

When a unit of language (the speech code) inputted at the step S203 does not exist in a category list for the current operation mode ("No" at S203) and there is not a program which belongs to this category under the current operation mode at the step S204 ("No" at S204), the television control unit 114 judges whether the inputted unit of language (the speech code) is present within a key word list (FIG. 21) (S2001). When the inputted unit of language is not in the key word list ("No" at S2001), the television control unit 114 returns to the stand-by state (S201) to wait for inputting of a next speech code without permitting any operation.

When the inputted unit of language (the speech code) is within the key word list ("YES" at S2001), the television control unit 114 judges whether a category to which the key word (i.e., the inputted unit of language) is among categories for the current operation mode (S2002). When this category is not among the categories for the current operation mode ("No" at S2002), the television control unit 114 returns to the stand-by state (S201) to wait for inputting of a next speech code without permitting any operation.

When this category is among the categories for the current operation mode ("YES" at S2002), the television control unit 114 judges whether there is a program in this category under the other operation mode (S2003). When there is not such a program ("No" at S2003), the television control unit 114 returns to the stand-by state (S201) to wait for inputting of a next speech code without permitting any operation.

When there is such a program ("YES" at S2003), the television control unit 114 instructs the on-screen display processing unit 115 to generate a program table corresponding to this category. The display apparatus 119 displays the program table received from the on-screen display processing unit 115 via the video synthesis processing unit 128 (S2004). The television control unit 114 sets up the operation mode (the terrestrial broadcast receiving mode or the BS broadcast receiving mode) in the memory device 116 (S206), and returns to the stand-by state to wait for inputting of a next speech code (S201).

Following this, the user designates a particular program from the program table. The television control unit allows inputting of the designated program, and permits the display apparatus 119 to display the program.

As described above, according to the preferred embodiment 4, the current operation mode is judged, and when a recognized unit of language can not make the television apparatus operate, a category in which the recognized unit of language is a key word makes the television apparatus operate.

In the preferred embodiment 4, when the television apparatus can not operate even in accordance with a category in which the recognized unit of language is a key word, a superordinate concept which covers the recognized unit of language may make the television apparatus operate as in the preferred embodiment 2. Further, in the preferred embodiment 4, when the television apparatus can not operate even in accordance with the category in which the recognized unit of language is a key word, the operation mode may be changed to make the television apparatus operate in accordance with the recognized unit of language to as in the preferred embodiment 3.

Preferred Embodiment

A television apparatus equipped with speech recognition function according to a preferred embodiment 5 of the present invention will now be described with reference to FIGS. 1 and 8 through 12.

First, a structure of the television apparatus equipped with speech recognition function according to the preferred embodiment 5 will be described. Since a block diagram (FIG. 1) showing the structure of the television apparatus equipped with speech recognition function according to the preferred embodiment 5 of the present invention is similar to that used for the preferred embodiment 1, a detailed description will not be given.

Figure 8:
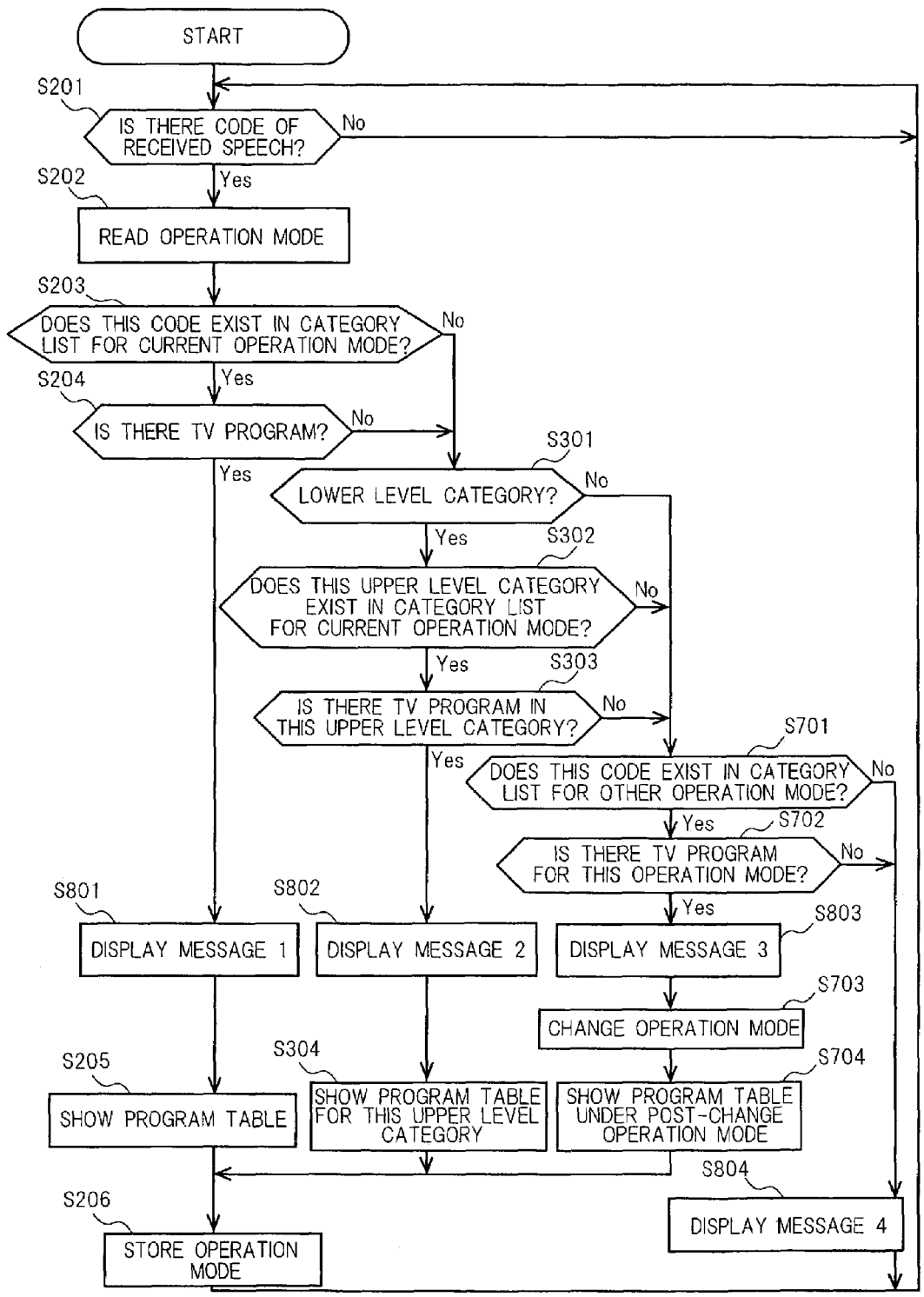
FIG. 8 is a flow chart showing by-category program search processing performed using a speech input in the television apparatus equipped with speech recognition function according to a preferred embodiment 5 of the present invention.

Next, a description will be given on the sequence of control for by-category program search utilizing a speech input in the television apparatus equipped with speech recognition function according to the preferred embodiment 5 which has such a structure described above. The preferred embodiment 5 is different from the preferred embodiments 2 and 3 in requiring to display on the screen a status of by-category program search processing. The preferred embodiment 5 is otherwise the same as the preferred embodiments 2 and 3. FIG. 8 is a flow chart showing by-category program search processing performed using a speech input in the television apparatus equipped with speech recognition function according to the preferred embodiment 5 of the present invention. In FIG. 8, steps (S201 through S206, S301 through S304, S701 through S704) denoted at the same reference symbols as those used in FIGS. 3 and 7 require to execute similar processing to that shown in FIGS. 3 and 7, and therefore, will not described again. Those portions which constitute a characteristic of the preferred embodiment 5 will be denoted at new reference symbols (S801 through S804) and will now be described.

When it is found at the step S204 there is a program which belongs to a category to which a unit of language inputted under the current operation mode belongs ("YES" at S204), the television control unit 114 notifies the on-screen display processing unit 115 of a message 1 (which is a message expressing activation of the operation in accordance with a unit of language uttered by a user, such as a message reading, "NOW SEARCHING IN 'SOCCER'.") and of display-ON. The display apparatus 119 displays the message 1 received from the on-screen display processing unit 115 via the video synthesis processing unit 128 (S801). The television control unit 114 instructs the on-screen display processing unit 115 to generate a program table corresponding to this category. The on-screen display processing unit 115 generates a screen for the program table, based on a program list stored in the BS digital program information data accumulating memory 124 for instance. The display apparatus 119 displays the program table received from the on-screen display processing unit 115 via the video synthesis processing unit 128 (S205). The television control unit 114 sets up the operation mode (the terrestrial broadcast receiving mode or the BS broadcast receiving mode) in the memory device 116 (S206), and returns to the stand-by state to wait for inputting of a next speech code (S201).

Further, when there is a program which belongs to an upper level category to which the unit of language (category) inputted under the current operation mode belongs ("YES" at S303), the television control unit 114 notifies the on-screen display processing unit 115 of a message 2 (a message which expresses displaying of a program table corresponding to a category of a superordinate concept beyond the unit of language (category) inputted by the user (or a program table corresponding to a category which contains a program inputted by the user), such as a message reading, "'SOCCER' IS NOT AVAILABLE. NOW SEARCHING IN 'SPORTS.'") and of display-ON. The display apparatus 119 displays the message 1 received from the on-screen display processing unit 115 via the video synthesis processing unit 128 (S802). The television control unit 114 instructs the on-screen display processing unit 115 to generate a program table for this upper level category. The display apparatus 119 displays the program table received from the on-screen display processing unit 115 via the video synthesis processing unit 128 (S304). The television control unit 114 sets up the operation mode in the memory device 116 (S206), and returns to the stand-by state to wait for inputting of a next speech code (S201).

Further, when there is a program for a category to which a unit of language inputted under other operation mode than the current operation mode belongs ("YES" at S702), the television control unit 114 notifies the on-screen display processing unit 115 of a message 3 (a message which expresses displaying of a program table corresponding to a category inputted by a user under other operation mode (other operation mode than the current operation mode), such as a message reading, "'NEWS REPORTS' IS NOT AVAILABLE ON TERRESTRIAL BROADCASTING. NOW SEARCHING AMONG BS DIGITAL BROADCASTS.") and of display-ON.

The display apparatus 119 displays the message 3 received from the on-screen display processing unit 115 via the video synthesis processing unit 128 (S803). The television control unit 114 switches to the other operation mode from the current operation mode (S703). The television control unit 114 instructs the on-screen display processing unit 115 to generate a program table corresponding to this category under the other operation mode. The display apparatus 119 displays the program table received from the on-screen display processing unit 115 via the video synthesis processing unit 128 (S704). The television control unit 114 sets up the operation mode (the terrestrial broadcast receiving mode or the BS broadcast receiving mode) in the memory device 116 (S206), and returns to the stand-by state to wait for inputting of a next speech code (S201).

After the steps S801, S802 and S803, the user designates a particular program from the program table. The television control unit allows inputting of the designated program, and permits the display apparatus 119 to display the program.

When the inputted unit of language (the speech code) (or category) is not in a category list for the other operation mode ("YES" at S701) and there is not a program which belongs to this category under the other operation mode ("YES" at S702), the television control unit 114 notifies the on-screen display processing unit 115 of a message 4 (a message which expresses that there is no program belonging to the category inputted by the user, such as a message reading, "'SOCCER' IS NOT BEING BROADCASTED IN ANY PROGRAM NOW.") and of display-ON. The display apparatus 119 displays the message 4 received from the on-screen display processing unit 115 via the video synthesis processing unit 128 (S804). The television control unit 114 then returns to the stand-by state to wait for inputting of a next speech code (S201).

When a program is found as a result of further search for a program belonging to an upper level category beyond a unit of language (category) inputted under the other operation mode at the step S804, the on-screen display processing unit 115 may generate and display a message 5 (not shown) (a message which expresses displaying of a program table corresponding to a category of a superordinate concept beyond the unit of language (category) inputted by the user under the other operation mode (or a program table for a category which contains the program inputted by the user), such as a message reading, "'SOCCER' IS NOT AVAILABLE. NOW SEARCHING IN 'SPORTS' AMONG BS DIGITAL BROADCASTS."). Following this, a program table corresponding to a category of a superordinate concept under the other operation mode may be generated and displayed. When there is not a program belonging to the upper level category beyond the unit of language (category) inputted under the other operation mode, the message 4 is generated and displayed.

Figure 9:
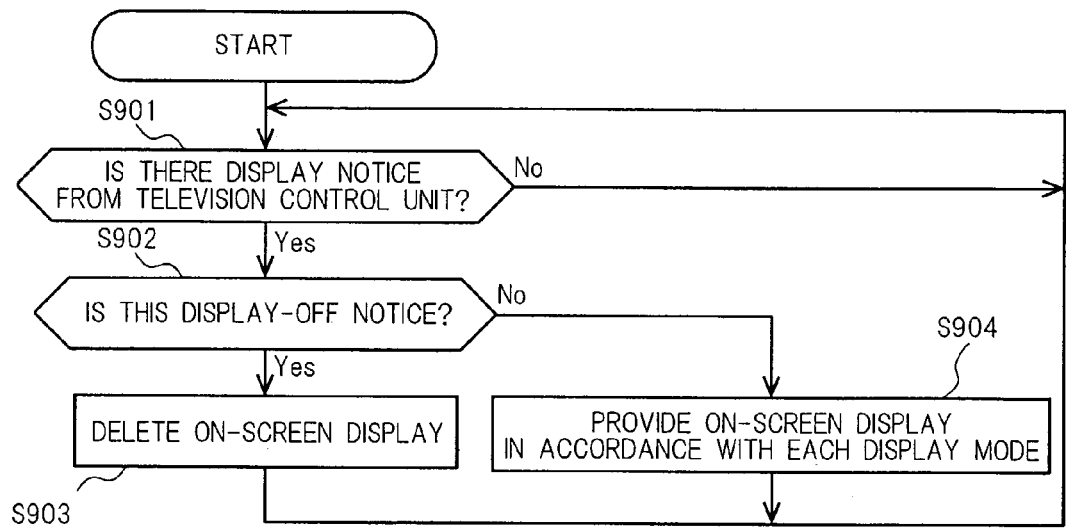
FIG. 9 is a flow chart showing control processing performed by an on-screen display processing unit 115 of the television apparatus equipped with speech recognition function according to the preferred embodiment 5 of the present invention.

The sequence of processing in the on-screen display processing unit 115 will now be described. FIG. 9 is a flow chart showing control processing performed by the on-screen display processing unit 115 of the television apparatus equipped with speech recognition function according to the preferred embodiment 5 of the present invention.

When receiving a display-OFF notice from the television control unit 114 ("YES" at S901, "YES" at S902), the on-screen display processing unit 115 deletes the on-screen display (S903) and returns to a stand-by state to wait for a notice of displaying from the television control unit 114.

On the contrary, when receiving a display-ON notice from the television control unit 114 ("YES" at S901, "No" at S902), the on-screen display processing unit 115 displays a message representing the notification or the like on the display apparatus 119 (S904), and returns to a stand-by state to wait for a notice of displaying from the television control unit 114.

Without any notice of displaying received from the television control unit 114 ("No" at S901), the state that there remains the on-screen display (ON or OFF) is maintained.

Figure 12:
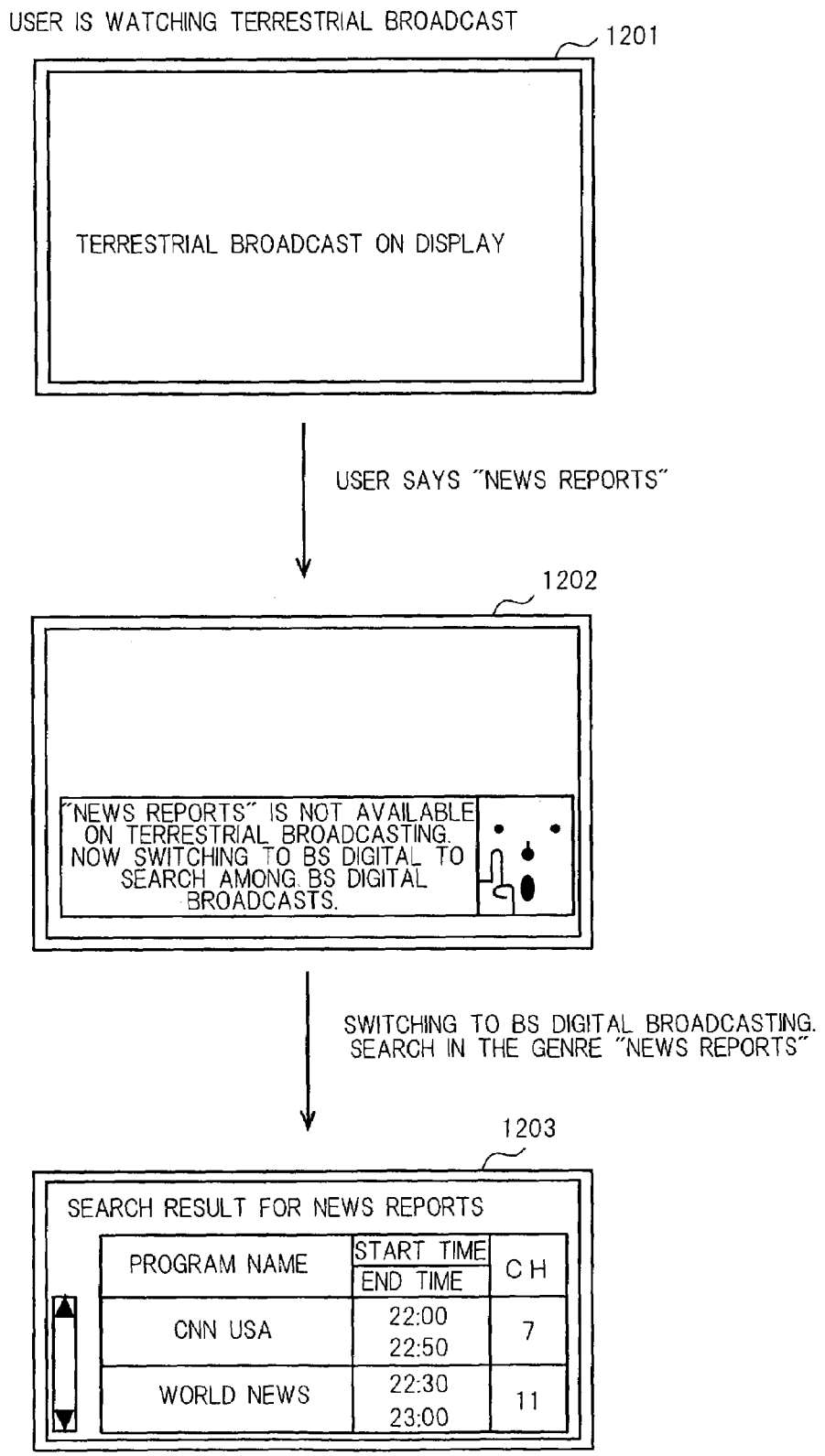
FIG. 12 is a screen transition diagram regarding displaying of a message 3 by the television apparatus equipped with speech recognition function according to the preferred embodiment 5 of the present invention.

The messages 1 through 4 will now be described with reference to FIGS. 10 through 12. FIG. 10 is a drawing of display messages and differences in category information between terrestrial analog broadcasts and BS digital broadcasts for the television apparatus equipped with speech recognition function according to the preferred embodiment 5 of the present invention.

Terrestrial analog broadcasting requires to execute by-category program search processing based on program data acquired by the UV program information data acquiring unit 126. Meanwhile, BS digital broadcasting requires to execute by-category program search processing based on program data acquired by the BS digital program information data acquiring unit 123. A data structure of program data is different between terrestrial analog broadcasting and BS digital broadcasting.

A situation that the message 1 is displayed will now be described. While a terrestrial analog broadcast is being aired, a user says "sports." The display apparatus 119 displays the message 1 which reads, "NOW SEARCHING IN 'SPORTS'." The display apparatus 119 then displays a search result for "SPORTS."

A situation that the message 2 is displayed will now be described. FIG. 11 is a screen transition diagram regarding displaying of the message 2 by the television apparatus equipped with speech recognition function according to the preferred embodiment 5 of the present invention. While a terrestrial analog broadcast is being aired (screen 1101), a user pronounces "soccer." The display apparatus 119 displays the message 2 (1002) which reads, "'SOCCER' IS NOT AVAILABLE. NOW SEARCHING IN 'SPORTS'."

(screen 1102). The display apparatus 119 then displays a search result for "SPORTS" (screen 1103).

A situation that the message 3 is displayed will now be described. FIG. 12 is a screen transition diagram regarding displaying of the message 3 by the television apparatus equipped with speech recognition function according to the preferred embodiment 5 of the present invention. While a terrestrial analog broadcast is being aired (screen 1201), a user pronounces "news reports." The display apparatus 119 displays the message 3 (1003) which reads, "'NEWS REPORTS' IS NOT AVAILABLE ON TERRESTRIAL BROADCASTING. NOW SWITCHING TO BS DIGITAL TO SEARCH AMONG BS DIGITAL BROADCASTS." (screen 1202). The display apparatus 119 then displays a search result for "NEWS REPORTS" (screen 1203).

A situation that the message 4 is displayed will now be described. While a terrestrial analog broadcast is being aired, a user pronounces "drama(s)." When there is not an aired program belonging to "DRAMAS" under all operation modes such as terrestrial broadcasting, BS broadcasting, etc., the display apparatus 119 displays the message 4 which reads, "THERE IS NO "DRAMAS" AVAILABLE NOW."

In this manner, according to the preferred embodiment 5, it is possible to tell a user, by means of an on-screen display, the reason why the inputted unit of language can not make the television apparatus operate, how the inputted unit of language makes the television apparatus operate, and the like.

Preferred Embodiment

Figure 13:
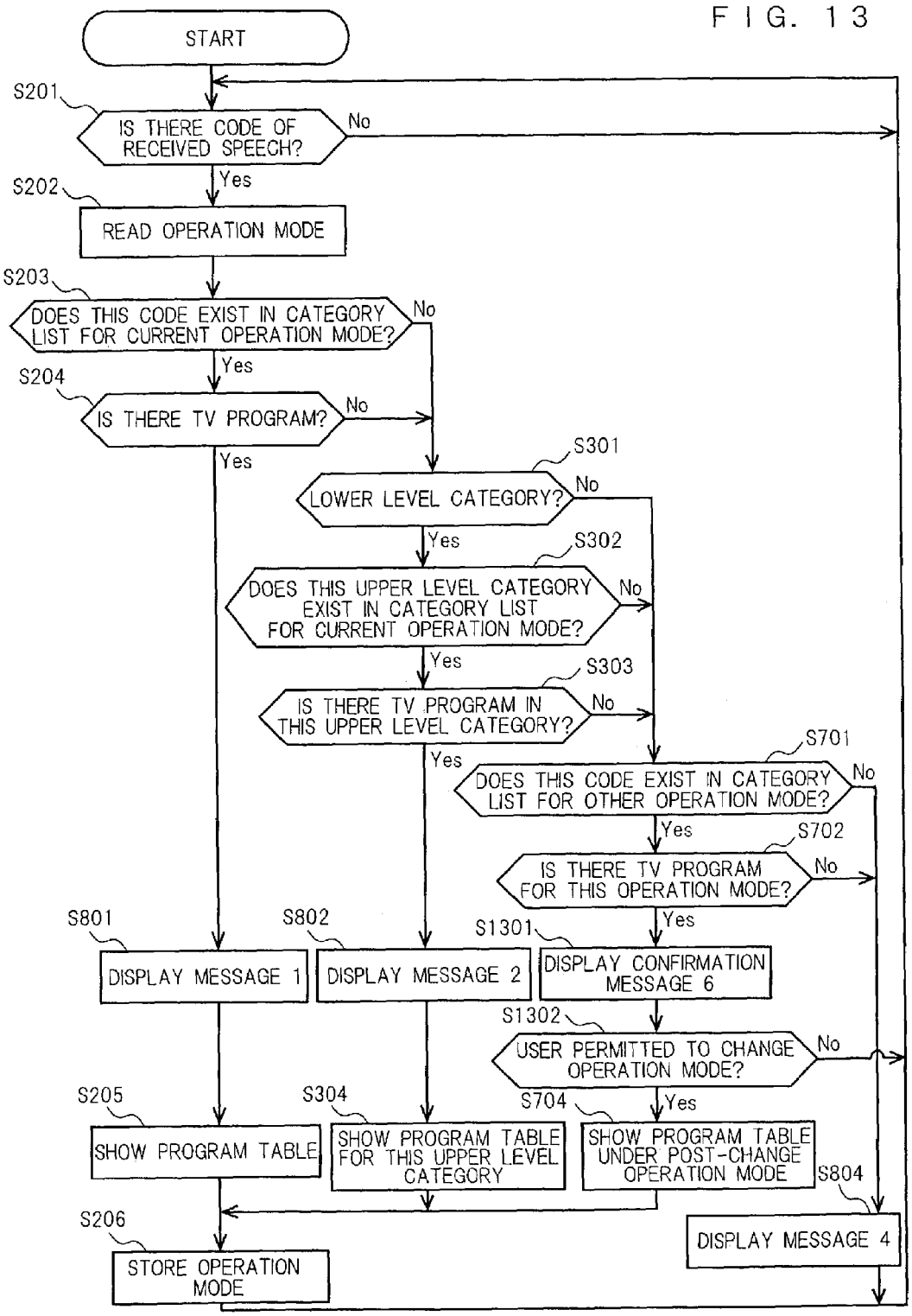
FIG. 13 is a flow chart showing by-category program search processing performed using a speech input in a television apparatus equipped with speech recognition function according to a preferred embodiment 6 of the present invention.
Figure 14:
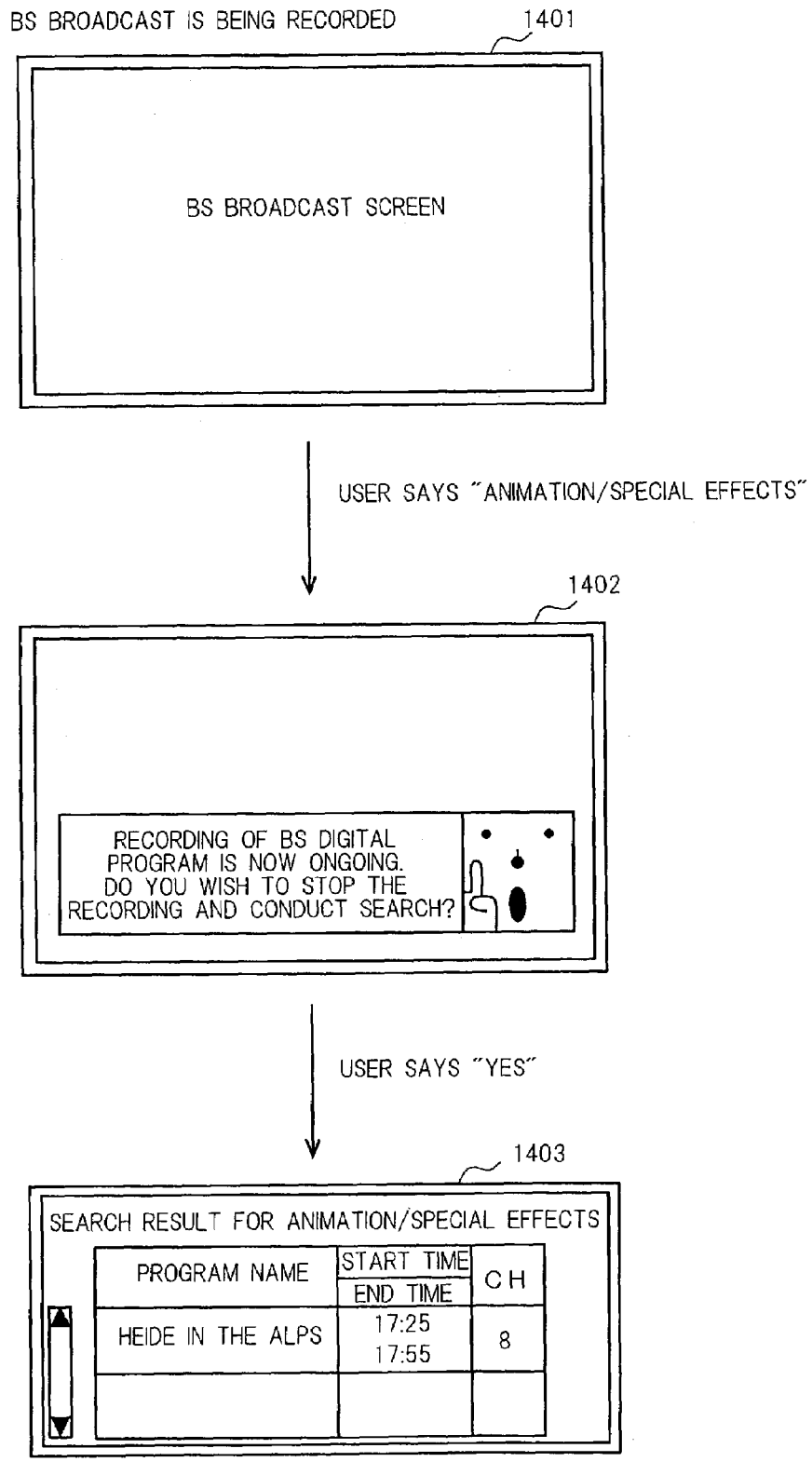
FIG. 14 is a screen transition diagram regarding displaying of a confirmation message 6 by the television apparatus equipped with speech recognition function according to the preferred embodiment 6 of the present invention.

A television apparatus equipped with speech recognition function according to a preferred embodiment 6 of the present invention will now be described with reference to FIGS. 1, 13 and 14.

First, a structure of the television apparatus equipped with speech recognition function according to the preferred embodiment 6 will be described. Since a block diagram (FIG. 1) showing the structure of the television apparatus equipped with speech recognition function according to the preferred embodiment 6 of the present invention is similar to that used for the preferred embodiment 1, a detailed description will not be given.

Next, a description will be given on the sequence of control for by-category program search utilizing a speech input in the television apparatus equipped with speech recognition function according to the preferred embodiment 6 which has such a structure described above. The preferred embodiment 6 is different from the preferred embodiment 5 in requiring an operation under a post-change operation mode. The preferred embodiment 6 is otherwise the same as the preferred embodiment 5. FIG. 13 is a flow chart showing by-category program search processing performed using a speech input in the television apparatus equipped with speech recognition function according to the preferred embodiment 6 of the present invention. In FIG. 13, steps denoted at the same reference symbols as those used in FIG. 8 require to execute similar processing to that shown in FIG. 8, and therefore, will not described again. Those portions which constitute a characteristic of the preferred embodiment 6 will be denoted at new reference symbols (S1301 and S1302) and will now be described.

When there is not a category for an inputted unit of language or a category of a superordinate concept or there is not a program belonging to such categories but there is a program belonging to a category to which a unit of language inputted under other operation mode (other operation mode than the current operation mode) belongs ("YES" at S702), the television control unit 114 notifies the on-screen display processing unit 115 of a confirmation message 6 (an inquiry message regarding whether the user permits to change the operation mode) and of display-ON. The display apparatus 119 displays the confirmation message 6 received from the on-screen display processing unit 115 via the video synthesis processing unit 128 (S1301). The user then answers whether to permit to change the operation mode (For instance, the user says "Yes."). The television control unit 114 judges whether the user has permitted to change the operation mode (S1302).

With a permission given ("YES" at S1302). The television control unit 114 switches to other operation mode from the current operation mode (S703). The television control unit 114 instructs the on-screen display processing unit 115 to generte a program table corresponding to this category for the other operation mode. The display apparatus 119 displays the program table received from the on-screen display processing unit 115 via the video synthesis processing unit 128 (S704). The television control unit 114 sets up the operation mode (the BS broadcast receiving mode for example) in the memory device 116 (S206), and returns to the stand-by state to wait for inputting of a next speech code (S201).

When the user did not permit to change the operation mode ("No" at S1302), the television control unit 114 returns to the stand-by state (S201) to wait for inputting of a next speech code without permitting any operation.

The confirmation message 6 will now be described with reference to FIG. 14. FIG. 14 is a screen transition diagram regarding displaying of the confirmation message 6 by the television apparatus equipped with speech recognition function according to the preferred embodiment 6 of the present invention. While a BS broadcast is being recorded (screen 1401), a user pronounces "animation/special effects." The display apparatus 119 displays the confirmation message 6 (screen 1402) which reads, "RECORDING OF BS DIGITAL PROGRAM IS NOW ONGOING. DO YOU WISH TO STOP THE RECORDING AND CONDUCT SEARCH?" (screen 1402). As the user says "Yes," the display apparatus 119 displays a search result for "ANIMATION/SPECIAL EFFECTS" (screen 1403).

As described above, according to the preferred embodiment 6, it is possible to provide a user with a notice for confirmation regarding whether to change the operation mode and operate in accordance with an accepted unit of language, and therefore, it is possible to guide the user to make a selection, instead of changing the operation mode and activating the operation by the accepted unit of language without a user's permission.

Although a confirmation message is displayed at the time of switching of the operation mode in the preferred embodiment 6, instead of this, the confirmation message may be displayed at the time of search under an upper level category. Alternatively, in addition to this, the confirmation message may be displayed also at the time of search under an upper level category.

Preferred Embodiment

A television apparatus equipped with speech recognition function according to a preferred embodiment 7 of the present invention will now be described with reference to FIGS. 1 and 15 through 18.

First, a structure of the television apparatus equipped with speech recognition function according to the preferred embodiment 7 will be described. Since a block diagram (FIG. 1) showing the structure of the television apparatus equipped with speech recognition function according to the preferred embodiment 7 of the present invention is similar to that used for the preferred embodiment 1, a detailed description will not be given.

Figure 15:
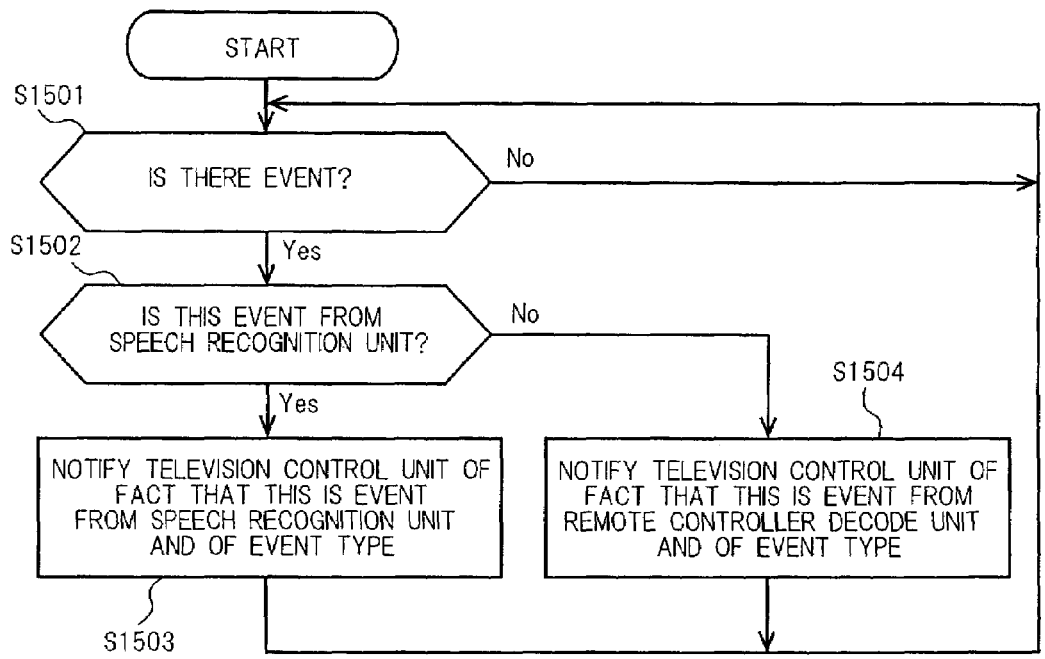
FIG. 15 is a flow chart showing control processing performed by an event managing unit 113 of a television apparatus equipped with speech recognition function according to a preferred embodiment 7 of the present invention.

Next, a description will be given on the sequence of control for an on-screen display time in the television apparatus equipped with speech recognition function according to the preferred embodiment 7 having such a structure above. FIG. 15 is a flow chart showing control processing performed by the event managing unit 113 of a television apparatus equipped with speech recognition function according to the preferred embodiment 7 of the present invention.

In FIG. 15, upon receipt of an event from the speech recognition unit 112 ("YES" at S1501, "YES" at S1502), the event managing unit 113 notifies the television control unit 114 of the fact that the received event is an event from the speech recognition unit 112 and the type of the event (S1503). The event managing unit 113 then returns to a stand-by state (S1501) to wait for an event from the remote controller decode unit 111 and the speech recognition unit 112.

On the contrary, upon receipt of an event from the remote controller decode unit 111 ("YES" at S1501, "No" at S1502), the event managing unit 113 notifies the television control unit 114 of the fact that the received event is an event from the remote controller decode unit 111 and the type of the event (S1504). The event managing unit 113 then returns to the stand-by state (S1501) to wait for an event from the remote controller decode unit 111 and the speech recognition unit 112.

Figure 16:
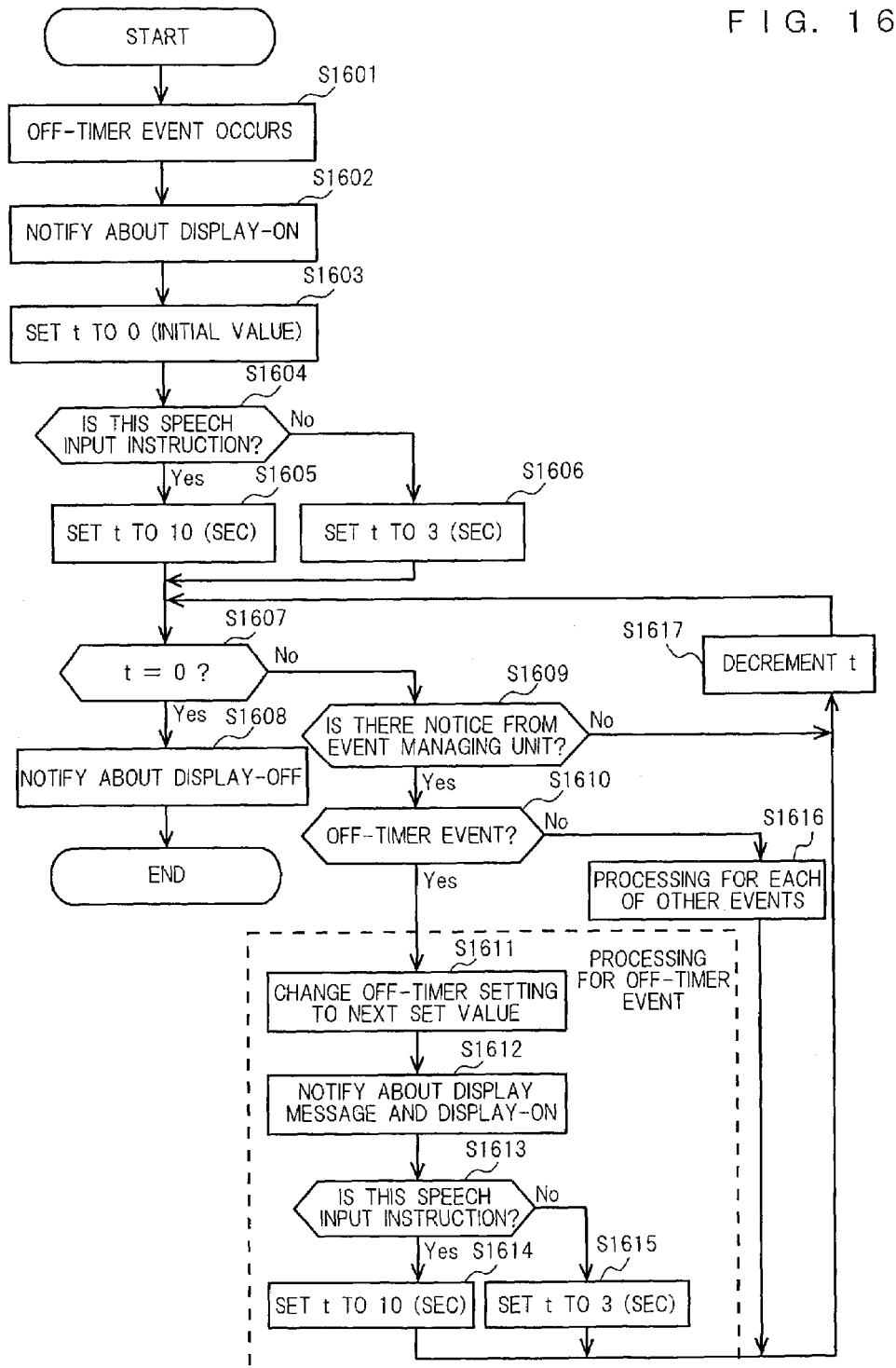
FIG. 16 is a flow chart showing control processing performed, in response to an event for setting up an off-timer time, by a television control unit 114 of the television apparatus equipped with speech recognition function according to the preferred embodiment 7 of the present invention.

FIG. 16 is a flow chart showing control processing performed, in response to an event for setting up the off-timer time, by the television control unit 114 of the television apparatus equipped with speech recognition function according to the preferred embodiment 7 of the present invention. In FIG. 16, first, the television control unit 114 receives an off-timer notice from the event managing unit 113 (S1601). The television control unit 114 notifies the on-screen display processing unit 115 of a display mode for setting of the off-timer time and display-ON (S1602).

The television control unit 114 sets an on-screen elimination time (t) to 0 (initial value) (S1603). The television control unit 114 then judges whether the instruction is an instruction fed as a speech input (including a unit of language) (S1604). When the inputted instruction (including a unit of language) is a speech input (when the inputted instruction is an event from the speech recognition unit 112) ("YES" at S1604), the television control unit 114 sets the on-screen elimination time (t) to ten seconds (S1605). When the inputted instruction (including a unit of language) was fed through the remote controller (when the inputted instruction is an event from the remote controller decode unit 111) ("No" at S1604), the television control unit 114 sets the on-screen elimination time (t) to three seconds (S1606).

Based on the time acquired from the timer control unit 117, the television control unit 114 judges whether the on-screen elimination time has elapsed (i.e., judges whether t=0 holds) (S1607). When it is found at S1607 that the on-screen elimination time has elapsed (when t=0 holds) ("YES" at S1607), the television control unit 114 notifies the on-screen display processing unit 115 of display-OFF (S1608).

When it is found at S1607 that the on-screen elimination time has not elapsed (when t=0 does not hold) ("No" at S1607), the television control unit 114 judges whether there is a new notice received from the event managing unit 113 (S1609). When there is no new notice received from the event managing unit 113 ("No" at S1609), the television control unit 114 decrements the on-screen elimination time (t) (S1617) and returns to a stand-by state (S1607) to wait for elapse of the on-screen elimination time.

When there is a new notice received from the event managing unit 113 at S1609 ("YES" at S1609), the television control unit 114 judges whether the type of the event is off-timer (S1610). When the type of the event is not off-timer ("No" at S1610), the television control unit 114 executes event processing in accordance with the type of the event (S1616).

When the type of the event is off-timer ("YES" at S1610), the television control unit 114 changes the off-timer setting from the current set value to a next set value (S1611). The television control unit 114 notifies the on-screen display processing unit 115 of the display mode for the off-timer setting and display-ON (S1612).

The television control unit 114 judges whether the instruction is an instruction fed as a speech input (including a unit of language) (S1613). When the inputted instruction (including a unit of language) is a speech input (when the inputted instruction is an event from the speech recognition unit 112) ("YES" at S1613), the television control unit 114 sets the on-screen elimination time (t) to ten seconds again (S1614). When the inputted instruction (including a unit of language) was fed through the remote controller (when the inputted instruction is an event from the remote controller decode unit 111) ("No" at S1613), the television control unit 114 sets the on-screen elimination time (t) to three seconds once again (S1615). After this processing (S1614, S1615, S1616), the television control unit 114 decrements the on-screen elimination time (t) (S1617), and returns to a stand-by state (S1607) to wait for elapse of the on-screen elimination time.

Figure 17:
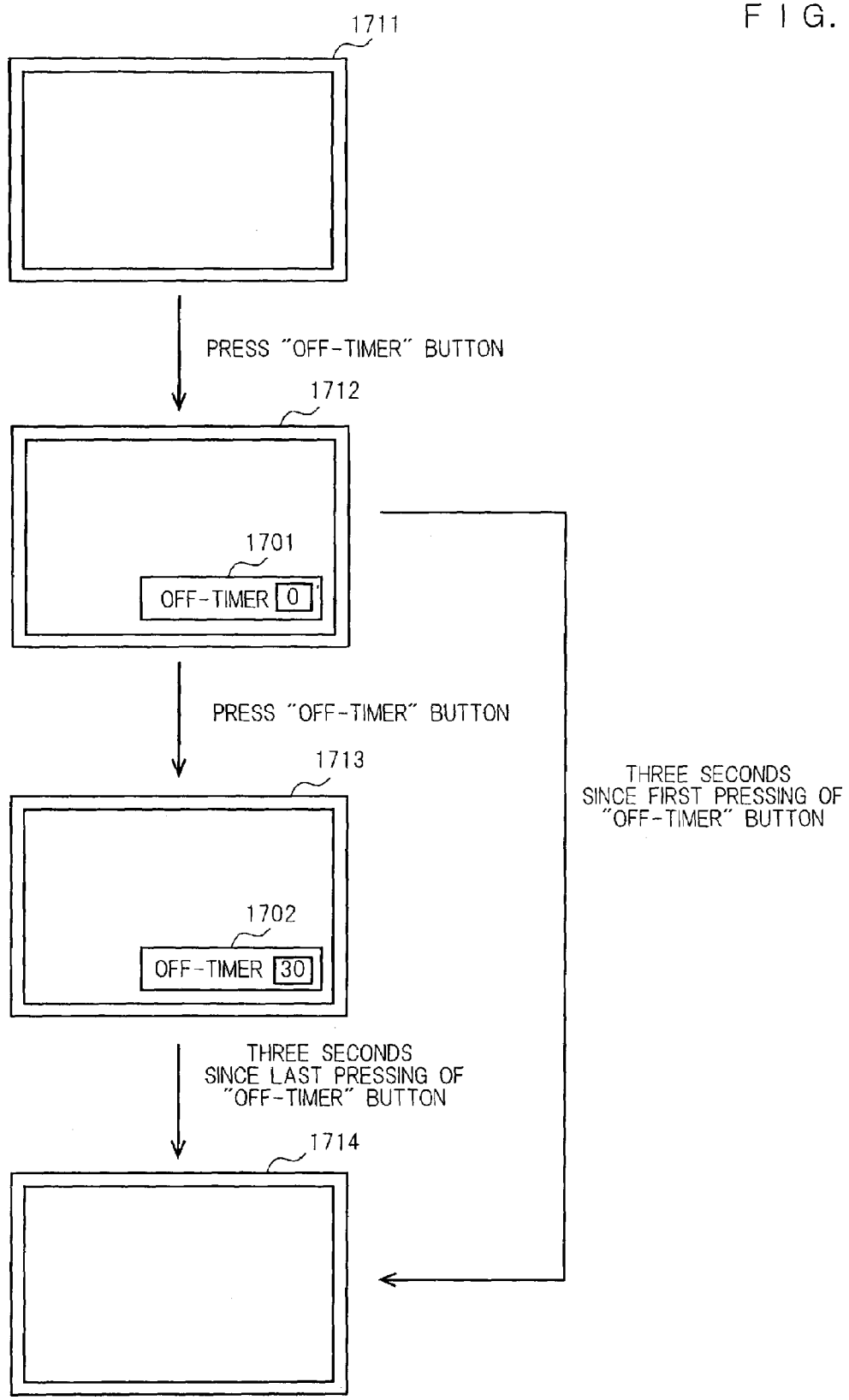
FIG. 17 is a drawing which shows operations to set the off-timer time which are given through a remote controller of the television apparatus equipped with speech recognition function according to the preferred embodiment 7 of the present invention.

FIG. 17 is a drawing which shows operations to set the off-timer time which are given through the remote controller of the television apparatus equipped with speech recognition function according to the preferred embodiment 7 of the present invention.

Assume that the display apparatus 119 is now displaying a screen 1711 which does not contain an on-screen display for setting of the off-timer time. In such a condition, as an off-timer time setting button is pressed on the remote controller, the display apparatus 119 provides an on-screen display which shows the current off-timer set value 1701 (screen 1712). At the same time, the origin of event sets the on-screen elimination time (three seconds) for use of the remote controller.

When the off-timer time setting button is pressed once again on the remote controller while the on-screen display of the off-timer time still remains (screen 1712), the next setting 1702 (30, 60, 90, 0 (min)) is toggled (screen 1713). At the same time, the origin of event sets the on-screen elimination time (three seconds) for use of the remote controller.

After three seconds since the first pressing of the off-timer time setting button or after three seconds since the last pressing of the off-timer time setting button, the on-screen display of the off-timer time is deleted (screen 1714).

Figure 18:
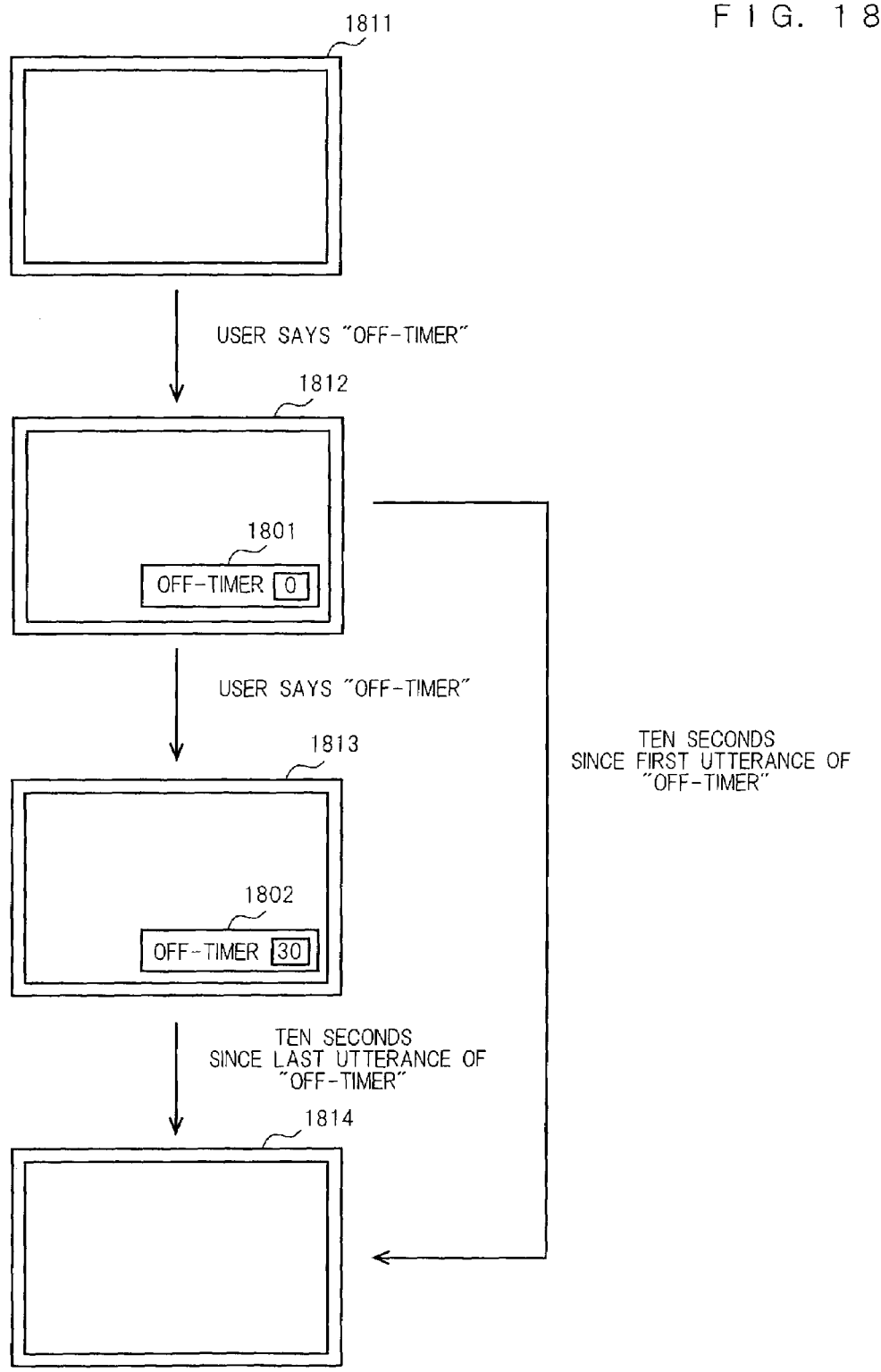
FIG. 18 is a drawing which shows operations to set the off-timer time which are given in the form of speech uttered toward the television apparatus equipped with speech recognition function according to the preferred embodiment 7 of the present invention.

FIG. 18 is a drawing which shows operations to set the off-timer time which are given in the form of speech uttered toward the television apparatus equipped with speech recognition function according to the preferred embodiment 7 of the present invention. During the illustrated operations, the processing initiated by pressing on the remote controller shown in FIG. 17 is initiated by utterance of speech.

Assume now that the display apparatus 119 is displaying a screen 1811 which does not contain an on-screen display of the off-timer time. In such a condition, as a user says "Off-timer," the display apparatus 119 provides an on-screen display which shows the current off-timer set value 1801

(screen 1812). At the same time, the origin of event sets the on-screen elimination time (ten seconds) for speech recognition.

When the user says "Off-timer" once again while the on-screen display of the off-timer time still remains (screen 1812), the next setting 1802 (30, 60, 90, 0 (min)) is toggled (screen 1813). At the same time, the origin of event sets the on-screen elimination time (ten seconds) for speech recognition.

After ten seconds since the first utterance of "off-timer" or after ten seconds since the last utterance of "off-timer," the on-screen display of the off-timer time is deleted (screen 1814).

Although off-timer has been described as the type of an event in the preferred embodiment 7, the event may be any such event which toggles the setting for every receipt of the event while on-screen display remains but which deletes the on-screen display after elapse of a certain period of time. In addition, the elimination time is not limited to the values according to the preferred embodiment 7. For example, if there is an apparatus which is capable of freely setting the on-screen elimination time responding to a speech input and the on-screen elimination time responding to an input fed through a switch, when the set value of the on-screen elimination time responding to the speech input is longer than the set value of the on-screen elimination time responding to the input fed through a switch, this apparatus falls under the technical scope of the present invention.

Thus, according to the preferred embodiment 7 of the present invention, it is possible to set the on-screen display time in accordance with an origin of event such as a remote controller and utterance of speech.

As described above, the present invention promises an advantageous effect that it is possible to realize a television apparatus equipped with speech recognition function which appropriately responds or does not respond to a unit of language which is provided as a speech input in accordance with the current operation mode.

The present invention promises an advantageous effect that it is possible to realize a television apparatus comprising a speech recognition function which makes the television apparatus actually operate based on a result of a judgment regarding the current operation mode and which notifies a user of an operation status.

The present invention promises an advantageous effect that it is possible to realize a television apparatus equipped with speech recognition function which appropriately responds or does not respond to a unit of language which is provided as a speech input in accordance with a selection made by a user.

The present invention promises an advantageous effect that it is possible to realize a television apparatus comprising a convenient-to-use speech recognition function which makes the television apparatus operate in accordance with an operable superordinate concept or operate after changing the operation mode, or which notifies a user of the reason why the apparatus can not operate, instead of prohibiting any operation when a unit of language uttered by a user is unacceptable.

The present invention promises an advantageous effect that it is possible to realize a television apparatus equipped with speech recognition function which automatically detects and displays a desired program or a program which is close to what is desired in a prompt manner, without switching among complex menus.

The present invention promises an advantageous effect that it is possible to realize a television apparatus comprising a speech recognition function which allows a user to comfortably change settings either when the user wishes to change the settings using the speech recognition function or when the user wishes to change the settings by pressing a switch.

The present invention promises an advantageous effect that it is possible to realize a television apparatus comprising a convenient-to-use speech recognition function which permits to set the on-screen display time in accordance with an origin of event such as a remote controller and utterance of speech.

While the foregoing has described the present invention in relation to preferred embodiments in certain details, the detailed structures according to the preferred embodiments described above may be modified. Combinations and an order of the respective elements may be modified without deviating from the scope and the spirit of the invention.

The invention claimed is:

1. A television apparatus equipped with speech recognition function, comprising:
   a speech recognition unit which receives speech and recognizes a unit of language included in said speech;
   a judging unit which judges whether said television apparatus can operate in accordance with said unit of language;
   a dictionary containing classifications by category, and
   a search unit which retrieves, from within said dictionary, other unit of language which belongs to the same category as said unit of language and which can make the television apparatus operate, when it is not possible for said television apparatus to operate in accordance with said unit of language, wherein
   when said search unit retrieves said other unit of language, said television apparatus operates in accordance with said other unit of language.

2. The television apparatus equipped with speech recognition function of claim 1, characterized in further comprising an on-screen display unit and/or a speech outputting unit, wherein when said television apparatus operates in accordance with said other unit of language, said on-screen display unit and/or said speech outputting unit provides a user with a notice which denotes that said television apparatus will operate in accordance with said other unit of language.

3. The television apparatus equipped with speech recognition function of claim 1, wherein the dictionary includes a hierarchical structure, and the search unit retrieves the other unit of language which has a superordinate concept beyond said unit of language and which can make the television apparatus operate from within said dictionary.

4. A method of controlling a television apparatus equipped with speech recognition function which comprises a dictionary containing classifications by category,
   said method comprising:
   a speech recognition step of receiving speech and recognizing a unit of language included in said speech;
   a judging step of judging whether said television apparatus can operate under the current operation mode in accordance with said unit of language;
   a search step of retrieving, from within said dictionary, other unit of language which belongs to the same category as said unit of language and which can make the television apparatus operate, when it is not possible for said television apparatus to operate in accordance with said unit of language; and
   an operation step of operating in accordance with said other unit of language, when said search unit retrieves said other unit of language.

5. A method of controlling a television apparatus equipped with speech recognition function of claim 4, further comprising:
- an on-screen displaying step of demanding or permitting a user to input an instruction, or displaying a screen for guiding the user about an inputting method for a predetermined display time; and
- an operation inputting step of detecting that the user has pressed a switch, moved a cursor displayed on the screen or touched on a touch panel, and thereby accepting an instruction, wherein
- said display time for inputting of a unit of language at said speech recognition step is longer than said display time for inputting of an instruction at said operation inputting step.

6. The method of controlling a television apparatus equipped with speech recognition function of claim 4, wherein the dictionary includes a hierarchical structure, and the search step retrieves the other unit of language which has a superordinate concept beyond said unit of language and which can make the television apparatus operate from within said dictionary.

7. A television apparatus having speech recognition capability and capable of operating under a terrestrial mode and a satellite mode, said apparatus comprising:
- a remote controller decode unit for decoding a code transmitted from an infrared remote controller;
- a speech recognition unit for recognizing units of language uttered by a user and wherein said speech recognition unit decodes the unit of language;
- a UV tuner for receiving a video/speech signal in a terrestrial mode;
- a UV program information data acquiring unit for acquiring UV program information data from the UV tuner;
- a UV program information data accumulating memory for accumulating UV program information data;
- a satellite tuner for receiving video/speech signals from satellite broadcasting;
- a satellite program data acquiring unit for acquiring satellite program information data from the satellite tuner;
- a satellite program information data accumulating memory for accumulating satellite program information data;
- a video/speech input switching unit for switching modes between the UV tuner and the satellite tuner;
- a speaker for outputting a speech signal from the video/speech input switching unit;
- a video signal processing unit for processing a video signal from the video/speech input switching unit;
- an event managing unit for receiving an instruction, said instruction comprising a code from the remote controller decode unit or a unit of language from the speech recognition unit, wherein the event managing unit judges the origin of the instruction and the type of instruction;
- a television control unit that controls the mode in which the television apparatus operates, and wherein said television control unit controls said television apparatus so as to operate the apparatus in accordance with the instruction when the managing unit judges that the television apparatus can operate under a current operation mode in accordance with the instruction, and the television control unit also controls the television apparatus to not operate the apparatus under the current operation mode when the event managing unit judges that the television apparatus cannot operate under the current operation mode in accordance with the instruction;
- a dictionary containing classifications by category; and
- a search unit that retrieves from the dictionary other units of language that belong to the same category as said unit of language and which can make the television apparatus operate when it is not possible for said television apparatus to operate in accordance with the unit of language as applied to the current mode of operation, and wherein said search unit retrieves said other unit of language, and said television control unit functions such that said television apparatus is allowed to operate in accordance with said other unit of language.

* * * * *

UNITED STATES PATENT AND TRADEMARK OFFICE
CERTIFICATE OF CORRECTION

PATENT NO. : 7,254,543 B2  
APPLICATION NO. : 10/321406  
DATED : August 7, 2007  
INVENTOR(S) : Toshio Ibaraki et al.

It is certified that error appears in the above-identified patent and that said Letters Patent is hereby corrected as shown below:

TITLE PAGE, ITEM [73] ASSIGNEE, delete the name "Toshio Ibaraki" and insert the name --Matsushita Electric Industrial Co., Ltd.--

Signed and Sealed this

Twenty-fifth Day of November, 2008

JON W. DUDAS  
*Director of the United States Patent and Trademark Office*